United States Patent
Salmon et al.

(10) Patent No.: US 11,887,093 B2
(45) Date of Patent: Jan. 30, 2024

(54) POINT OF INTERACTION LOYALTY CURRENCY REDEMPTION IN A TRANSACTION

(71) Applicant: Visa International Service Association, San Francisco, CA (US)

(72) Inventors: Diane C. Salmon, Lafayette, CA (US); Meara Day, Sunnyvale, CA (US); Leigh Amaro, Woodside, CA (US)

(73) Assignee: Visa International Service Association, San Francisco, CA (US)

(*) Notice: Subject to any disclaimer, the term of this patent is extended or adjusted under 35 U.S.C. 154(b) by 249 days.

(21) Appl. No.: 17/226,432

(22) Filed: Apr. 9, 2021

(65) Prior Publication Data

US 2021/0295297 A1 Sep. 23, 2021

Related U.S. Application Data

(63) Continuation of application No. 16/545,394, filed on Aug. 20, 2019, now Pat. No. 11,004,052, which is a
(Continued)

(51) Int. Cl.
*G06Q 20/20* (2012.01)
*G06Q 20/10* (2012.01)
(Continued)

(52) U.S. Cl.
CPC ........... *G06Q 20/206* (2013.01); *G06Q 20/06* (2013.01); *G06Q 20/10* (2013.01); *G06Q 20/20* (2013.01);
(Continued)

(58) Field of Classification Search
CPC ...... G06Q 20/206; G06Q 20/06; G06Q 20/10; G06Q 20/20; G06Q 20/227; G06Q 20/387;
(Continued)

(56) References Cited

U.S. PATENT DOCUMENTS 2,025,372 A 12/1935 Blanford
4,941,090 A 7/1990 McCarthy
(Continued)

FOREIGN PATENT DOCUMENTS

CN 1584894 A 2/2005
JP 2002269423 A * 9/2002
(Continued)

OTHER PUBLICATIONS

Punch, L. (2002). The cash-rebate card, part II. Credit Card Management, 15(8), 54-58. Retrieved from https://www.proquest.com/trade-journals/cash-rebate-card-part-ii/docview/201137185/se-2 (Year: 2002).*

(Continued)

*Primary Examiner* — Ashford S Hayles
(74) *Attorney, Agent, or Firm* — The Webb Law Firm

(57) ABSTRACT

Multiple different non-financial loyalty currencies held by different issuers are used by a consumer as financial tender for a transaction with a merchant. Each issuer pays to a primary issuer the financial currency value of the non-financial loyalty currencies being held in return for a corresponding reduction of the balance of non-financial loyalty currency. For each reduced balance, the primary issuer adds an equivalent primary loyalty currency to a primary loyalty account for the consumer. The primary issuer pays the merchant for the transaction in financial currency and makes an equivalent reduction in the balance of the primary loyalty currency. The financial value of each loyalty currency may be dependent upon its use in a transaction with a competitor of a merchant supplying loyalty currency to the consumer.

20 Claims, 15 Drawing Sheets

Related U.S. Application Data continuation of application No. 15/632,098, filed on Jun. 23, 2017, now Pat. No. 10,430,774, which is a continuation of application No. 12/704,445, filed on Feb. 11, 2010, now Pat. No. 9,721,238.

(60) Provisional application No. 61/152,614, filed on Feb. 13, 2009.

(51) Int. Cl.
| | |
|---|---|
| *G06Q 20/22* | (2012.01) |
| *G06Q 20/38* | (2012.01) |
| *G06Q 20/40* | (2012.01) |
| *G06Q 30/02* | (2023.01) |
| *G06Q 40/02* | (2023.01) |
| *G06Q 20/06* | (2012.01) |
| *G06Q 30/0226* | (2023.01) |

(52) U.S. Cl.
CPC ......... *G06Q 20/227* (2013.01); *G06Q 20/387* (2013.01); *G06Q 20/40* (2013.01); *G06Q 30/02* (2013.01); *G06Q 30/0227* (2013.01); *G06Q 40/02* (2013.01)

(58) Field of Classification Search
CPC .... G06Q 20/40; G06Q 30/02; G06Q 30/0227; G06Q 40/02
See application file for complete search history.

(56) References Cited

U.S. PATENT DOCUMENTS

| | | | |
|---|---|---|---|
| 5,025,372 A | 6/1991 | Burton et al. | |
| 5,117,355 A | 5/1992 | McCarthy | |
| 5,202,826 A | 4/1993 | McCarthy | |
| 5,287,268 A | 2/1994 | McCarthy | |
| 5,649,118 A | 7/1997 | Carlisle et al. | |
| 5,689,100 A | 11/1997 | Carrithers et al. | |
| 5,774,870 A | 6/1998 | Storey | |
| 5,794,118 A | 8/1998 | Yoshinobu | |
| 5,794,210 A | 8/1998 | Goldhaber et al. | |
| RE36,116 E | 2/1999 | McCarthy | |
| 5,923,016 A | 7/1999 | Fredregill et al. | |
| 5,937,391 A | 8/1999 | Ikeda et al. | |
| 5,956,694 A | 9/1999 | Powell | |
| 6,032,136 A | 2/2000 | Brake, Jr. et al. | |
| 6,138,911 A | 10/2000 | Fredregill et al. | |
| 6,243,687 B1 | 6/2001 | Powell | |
| 6,251,017 B1 | 6/2001 | Leason et al. | |
| 6,332,126 B1 | 12/2001 | Peirce et al. | |
| 6,334,108 B1 | 12/2001 | Deaton et al. | |
| 6,336,099 B1 | 1/2002 | Barnett et al. | |
| 6,341,353 B1 | 1/2002 | Herman et al. | |
| 6,408,286 B1 | 6/2002 | Heiden | |
| 6,450,407 B1 | 9/2002 | Freeman et al. | |
| 6,594,640 B1 | 7/2003 | Postrel | |
| 6,606,745 B2 | 8/2003 | Maggio | |
| 6,663,105 B1 | 12/2003 | Sullivan et al. | |
| 6,721,743 B1 | 4/2004 | Sakakibara | |
| 6,741,968 B2 | 5/2004 | Jacoves et al. | |
| 6,748,365 B1 | 6/2004 | Quinlan et al. | |
| 6,820,061 B2 | 11/2004 | Postrel | |
| 6,829,586 B2 | 12/2004 | Postrel | |
| 6,842,739 B2 | 1/2005 | Postrel | |
| 6,856,820 B1 | 2/2005 | Kolls | |
| 6,865,547 B1 | 3/2005 | Brake, Jr. et al. | |
| 6,910,003 B1 | 6/2005 | Arnold et al. | |
| 6,915,271 B1 * | 7/2005 | Meyer .................. | G06Q 30/02 705/14.35 |
| 6,947,898 B2 | 9/2005 | Postrel | |
| 6,978,250 B1 | 12/2005 | Kawan et al. | |
| 7,054,830 B1 | 5/2006 | Eggleston et al. | |
| 7,054,930 B1 | 5/2006 | Cheriton | |
| 7,072,864 B2 | 7/2006 | Brake, Jr. et al. | |
| 7,096,190 B2 | 8/2006 | Postrel | |
| 7,134,087 B2 | 11/2006 | Bushold et al. | |
| 7,163,145 B2 | 1/2007 | Cohagan et al. | |
| 7,263,507 B1 | 8/2007 | Brake, Jr. et al. | |
| 7,370,811 B2 | 5/2008 | Turner et al. | |
| 7,376,580 B1 | 5/2008 | Walker et al. | |
| 7,398,225 B2 | 7/2008 | Voltmer et al. | |
| 7,424,617 B2 | 9/2008 | Boyd et al. | |
| 7,428,498 B2 | 9/2008 | Voltmer et al. | |
| 7,506,804 B2 * | 3/2009 | Zajkowski ............ | G07F 7/1008 235/375 |
| 7,516,883 B2 * | 4/2009 | Hardesty ................ | G06Q 40/02 235/380 |
| 7,606,730 B2 | 10/2009 | Antonucci | |
| 7,624,041 B2 | 11/2009 | Postrel | |
| 7,665,660 B2 | 2/2010 | Degliantoni et al. | |
| 7,680,688 B2 * | 3/2010 | Hessburg ............... | G06Q 30/02 705/14.33 |
| 7,686,218 B2 | 3/2010 | Hessburg et al. | |
| 7,742,943 B2 | 6/2010 | Postrel | |
| 7,753,264 B2 | 7/2010 | Shafer et al. | |
| 7,765,124 B2 | 7/2010 | Postrel | |
| 7,769,630 B2 | 8/2010 | Postrel | |
| 7,777,053 B2 | 8/2010 | Sanganbhatla et al. | |
| 7,783,566 B2 * | 8/2010 | Armes ................... | G06Q 20/02 705/40 |
| 7,828,206 B2 | 11/2010 | Hessburg et al. | |
| 7,844,490 B2 | 11/2010 | Patterson | |
| 7,853,529 B1 | 12/2010 | Walker et al. | |
| 7,868,218 B2 | 1/2011 | Clark et al. | |
| 7,870,022 B2 | 1/2011 | Bous et al. | |
| 7,894,634 B2 | 2/2011 | Chung | |
| 7,958,030 B2 | 6/2011 | Kemper et al. | |
| 8,010,405 B1 | 8/2011 | Bortolin et al. | |
| 8,046,256 B2 | 10/2011 | Chien et al. | |
| 8,155,999 B2 | 4/2012 | de Boer et al. | |
| 8,180,671 B2 * | 5/2012 | Cohagan ............ | G06Q 30/0233 705/14.27 |
| 8,265,993 B2 | 9/2012 | Chien et al. | |
| 8,266,031 B2 | 9/2012 | Norris et al. | |
| 8,285,643 B2 | 10/2012 | Isaacson et al. | |
| 8,301,593 B2 | 10/2012 | Hoffmann et al. | |
| 8,302,030 B2 | 10/2012 | Soroca et al. | |
| 8,313,023 B1 | 11/2012 | McGhie et al. | |
| 8,315,929 B2 | 11/2012 | Allen-Rouman et al. | |
| 8,332,290 B1 | 12/2012 | Venturo et al. | |
| 8,341,081 B1 | 12/2012 | Wang et al. | |
| 8,342,399 B1 | 1/2013 | McGhie et al. | |
| 8,401,967 B1 | 3/2013 | Postrel | |
| 8,458,016 B1 * | 6/2013 | Medina, III .......... | G06Q 30/02 705/14.31 |
| 8,463,706 B2 | 6/2013 | Cervenka et al. | |
| 8,478,640 B2 | 7/2013 | Postrel | |
| 8,511,550 B1 | 8/2013 | McGhie et al. | |
| 8,538,812 B2 | 9/2013 | Ramer et al. | |
| 8,612,208 B2 | 12/2013 | Cooper et al. | |
| 8,630,989 B2 | 1/2014 | Blohm et al. | |
| 8,639,629 B1 | 1/2014 | Hoffman | |
| 8,682,791 B2 | 3/2014 | Bies et al. | |
| 8,725,568 B2 | 5/2014 | Cervenka et al. | |
| 8,880,431 B2 | 11/2014 | Ovick et al. | |
| 8,965,810 B2 | 2/2015 | Cervenka et al. | |
| 9,031,859 B2 | 5/2015 | Salmon et al. | |
| 2001/0034654 A1 | 10/2001 | Vigil et al. | |
| 2001/0037241 A1 | 11/2001 | Puri | |
| 2001/0054003 A1 * | 12/2001 | Chien .................... | G06Q 20/10 705/14.27 |
| 2002/0013728 A1 * | 1/2002 | Wilkman ............ | G06Q 30/0222 705/14.69 |
| 2002/0026354 A1 | 2/2002 | Shoji et al. | |
| 2002/0046116 A1 | 4/2002 | Hohle et al. | |
| 2002/0052860 A1 | 5/2002 | Geshwind | |
| 2002/0062249 A1 | 5/2002 | Iannacci | |
| 2002/0103753 A1 | 8/2002 | Schimmel | |
| 2002/0107731 A1 | 8/2002 | Teng | |
| 2002/0128057 A1 | 9/2002 | Walker et al. | |
| 2002/0160761 A1 | 10/2002 | Wolfe | |

(56) References Cited

U.S. PATENT DOCUMENTS

| | | |
|---|---|---|
| 2002/0194128 A1* | 12/2002 | Maritzen ............... G06Q 20/10 705/40 |
| 2003/0004808 A1 | 1/2003 | Elhaoussine et al. |
| 2003/0040964 A1 | 2/2003 | Lacek |
| 2003/0055727 A1 | 3/2003 | Walker et al. |
| 2003/0097310 A1 | 5/2003 | Ono et al. |
| 2003/0115100 A1* | 6/2003 | Teicher ............... G06Q 30/0211 705/14.33 |
| 2003/0120554 A1 | 6/2003 | Hogan et al. |
| 2003/0140004 A1 | 7/2003 | O'Leary et al. |
| 2003/0144907 A1 | 7/2003 | Cohen, Jr. et al. |
| 2003/0171992 A1 | 9/2003 | Blagg et al. |
| 2003/0200144 A1* | 10/2003 | Antonucci ......... G06Q 30/0226 705/14.28 |
| 2003/0208754 A1* | 11/2003 | Sridhar ............... H04N 21/2668 348/E7.071 |
| 2003/0216967 A1 | 11/2003 | Williams |
| 2003/0225618 A1* | 12/2003 | Hessburg ............... G06Q 10/02 705/14.27 |
| 2003/0225619 A1* | 12/2003 | Dokken ............. G06Q 30/0228 705/14.29 |
| 2003/0233439 A1 | 12/2003 | Stone et al. |
| 2003/0236704 A1* | 12/2003 | Antonucci ......... G06Q 30/0283 705/14.3 |
| 2003/0236712 A1 | 12/2003 | Antonucci et al. |
| 2004/0024739 A1 | 2/2004 | Copperman et al. |
| 2004/0049423 A1 | 3/2004 | Kawashima et al. |
| 2004/0083170 A1 | 4/2004 | Bam et al. |
| 2004/0088216 A1 | 5/2004 | Bangalore |
| 2004/0088376 A1 | 5/2004 | McCanne et al. |
| 2004/0104760 A1 | 6/2004 | Ando |
| 2004/0117250 A1 | 6/2004 | Lubow et al. |
| 2004/0133472 A1 | 7/2004 | Leason et al. |
| 2004/0138949 A1 | 7/2004 | Darnton et al. |
| 2004/0186773 A1* | 9/2004 | George ............... G06Q 40/00 705/14.27 |
| 2004/0203648 A1 | 10/2004 | Wong |
| 2004/0238622 A1 | 12/2004 | Freiberg |
| 2004/0249710 A1 | 12/2004 | Smith et al. |
| 2004/0260608 A1 | 12/2004 | Lewis et al. |
| 2005/0010533 A1 | 1/2005 | Cooper |
| 2005/0021399 A1 | 1/2005 | Postrel |
| 2005/0021401 A1* | 1/2005 | Postrel ............... G06Q 30/0229 705/14.3 |
| 2005/0043992 A1* | 2/2005 | Cohagan ............... G06Q 30/02 705/14.27 |
| 2005/0050225 A1 | 3/2005 | Tatman |
| 2005/0060225 A1* | 3/2005 | Postrel ............... G06Q 30/0208 705/14.28 |
| 2005/0080727 A1 | 4/2005 | Postrel |
| 2005/0091152 A1 | 4/2005 | Suisa |
| 2005/0096975 A1 | 5/2005 | Moshe |
| 2005/0114213 A1 | 5/2005 | Smith et al. |
| 2005/0119938 A1 | 6/2005 | Smith et al. |
| 2005/0149394 A1* | 7/2005 | Postrel ............... G06Q 30/02 705/14.25 |
| 2005/0205666 A1 | 9/2005 | Ward et al. |
| 2005/0240472 A1* | 10/2005 | Postrel ............... G06Q 30/0623 705/14.27 |
| 2005/0240478 A1 | 10/2005 | Lubow et al. |
| 2005/0251446 A1* | 11/2005 | Jiang ............... G06Q 20/40 235/380 |
| 2005/0251469 A1 | 11/2005 | Nandakumar |
| 2005/0267800 A1* | 12/2005 | Tietzen ............... G06Q 30/0211 705/14.27 |
| 2006/0010033 A1* | 1/2006 | Thomas ............. G06Q 30/0228 705/14.29 |
| 2006/0020511 A1* | 1/2006 | Postrel ............. G06Q 30/0228 705/14.24 |
| 2006/0053056 A1 | 3/2006 | Alspach-Goss et al. |
| 2006/0059040 A1* | 3/2006 | Eldred ............... G06Q 30/0236 705/14.27 |
| 2006/0111978 A1* | 5/2006 | Tietzen ............... G06Q 30/0215 705/14.27 |
| 2006/0129456 A1 | 6/2006 | Walker et al. |
| 2006/0136299 A1 | 6/2006 | Ruhmkorf |
| 2006/0161478 A1* | 7/2006 | Turner ............... G06Q 30/0226 705/14.27 |
| 2006/0181515 A1 | 8/2006 | Fletcher et al. |
| 2006/0184419 A1 | 8/2006 | Postrel |
| 2006/0190337 A1 | 8/2006 | Ayers, Jr. et al. |
| 2006/0206376 A1 | 9/2006 | Gibbs et al. |
| 2006/0208064 A1 | 9/2006 | Mendelovich et al. |
| 2006/0208065 A1* | 9/2006 | Mendelovich ......... G06Q 20/227 705/14.27 |
| 2006/0224454 A1* | 10/2006 | Kantor ............... G06Q 30/0267 705/14.3 |
| 2006/0253320 A1 | 11/2006 | Heywood |
| 2006/0253321 A1* | 11/2006 | Heywood ............. G06Q 30/0224 705/14.18 |
| 2006/0253392 A1 | 11/2006 | Davies |
| 2006/0259364 A1 | 11/2006 | Strock et al. |
| 2006/0259390 A1 | 11/2006 | Rosenberger |
| 2006/0261149 A1 | 11/2006 | Raghavendra Tulluri |
| 2006/0277103 A1 | 12/2006 | Fujita et al. |
| 2006/0287943 A1 | 12/2006 | Postrel |
| 2007/0005416 A1* | 1/2007 | Jackson ............. G06Q 30/0215 705/14.15 |
| 2007/0005510 A1 | 1/2007 | Bloodworth et al. |
| 2007/0011044 A1 | 1/2007 | Hansen |
| 2007/0038515 A1* | 2/2007 | Postrel ............... G06Q 20/10 705/14.3 |
| 2007/0043613 A1 | 2/2007 | Longest |
| 2007/0043619 A1 | 2/2007 | Leason et al. |
| 2007/0043620 A1 | 2/2007 | Leason et al. |
| 2007/0078719 A1* | 4/2007 | Schmitt ............... G06Q 30/02 705/14.27 |
| 2007/0100691 A1 | 5/2007 | Patterson |
| 2007/0105536 A1 | 5/2007 | Tingo, Jr. |
| 2007/0112629 A1 | 5/2007 | Solomon et al. |
| 2007/0129955 A1 | 6/2007 | Dalmia et al. |
| 2007/0129998 A1 | 6/2007 | Postrel |
| 2007/0130011 A1 | 6/2007 | Postrel |
| 2007/0143178 A1 | 6/2007 | Citrin et al. |
| 2007/0168354 A1 | 7/2007 | Ramer et al. |
| 2007/0192784 A1 | 8/2007 | Postrel |
| 2007/0198338 A1 | 8/2007 | Heywood |
| 2007/0214049 A1 | 9/2007 | Postrel |
| 2007/0226059 A1 | 9/2007 | Postrel |
| 2007/0260509 A1 | 11/2007 | Hines |
| 2007/0288313 A1 | 12/2007 | Brodson et al. |
| 2008/0010154 A1* | 1/2008 | Tietzen ............... G06Q 30/0207 705/14.17 |
| 2008/0011820 A1 | 1/2008 | Brown et al. |
| 2008/0011837 A1 | 1/2008 | Wesley |
| 2008/0021784 A1 | 1/2008 | Hessburg et al. |
| 2008/0021785 A1* | 1/2008 | Hessburg ............. G06Q 40/04 705/14.27 |
| 2008/0040222 A1* | 2/2008 | Gee ............... G06Q 30/0222 705/14.23 |
| 2008/0040270 A1* | 2/2008 | Buchheit ............. G06Q 20/381 705/41 |
| 2008/0059303 A1* | 3/2008 | Fordyce ............. G06Q 30/0223 705/14.27 |
| 2008/0071640 A1 | 3/2008 | Nguyen |
| 2008/0077499 A1 | 3/2008 | Ariff et al. |
| 2008/0093438 A1* | 4/2008 | Berntsen ............. G06Q 40/02 235/379 |
| 2008/0103968 A1 | 5/2008 | Bies et al. |
| 2008/0120221 A1* | 5/2008 | Toneguzzo ........... G06Q 40/04 705/37 |
| 2008/0133350 A1* | 6/2008 | White ............... G06Q 20/20 705/14.27 |
| 2008/0133351 A1* | 6/2008 | White ............... G07G 1/14 705/14.27 |
| 2008/0147496 A1 | 6/2008 | Bal et al. |
| 2008/0147534 A1 | 6/2008 | Ephrati et al. |
| 2008/0154676 A1 | 6/2008 | Suk |
| 2008/0154722 A1 | 6/2008 | Galinos |
| 2008/0177627 A1 | 7/2008 | Cefail |

(56) References Cited

U.S. PATENT DOCUMENTS

| | | |
|---|---|---|
| 2008/0195528 A1 | 8/2008 | Keithley |
| 2008/0201224 A1* | 8/2008 | Owens .................. G06Q 20/12 705/14.15 |
| 2008/0201226 A1 | 8/2008 | Carlson et al. |
| 2008/0210753 A1* | 9/2008 | Plozay .................. G06Q 30/02 705/14.27 |
| 2008/0217397 A1 | 9/2008 | Degliantoni et al. |
| 2008/0221986 A1 | 9/2008 | Soicher et al. |
| 2008/0228563 A1 | 9/2008 | Zellner et al. |
| 2008/0228583 A1 | 9/2008 | MacDonald et al. |
| 2008/0249861 A1 | 10/2008 | Carotta et al. |
| 2008/0270246 A1 | 10/2008 | Chen |
| 2008/0313034 A1 | 12/2008 | Wise |
| 2008/0313044 A1 | 12/2008 | Aaltonen et al. |
| 2009/0006203 A1 | 1/2009 | Fordyce, III et al. |
| 2009/0018909 A1 | 1/2009 | Grecia |
| 2009/0030793 A1* | 1/2009 | Fordyce, III ....... G06Q 30/0229 705/14.27 |
| 2009/0048884 A1 | 2/2009 | Olives et al. |
| 2009/0048916 A1* | 2/2009 | Nuzum .................. G06Q 20/20 705/14.14 |
| 2009/0076911 A1 | 3/2009 | Vo et al. |
| 2009/0076912 A1 | 3/2009 | Rajan et al. |
| 2009/0094118 A1* | 4/2009 | Antonucci ......... G06Q 30/0211 705/26.1 |
| 2009/0106112 A1 | 4/2009 | Dalmia et al. |
| 2009/0106115 A1 | 4/2009 | James et al. |
| 2009/0106300 A1 | 4/2009 | Brown |
| 2009/0112721 A1 | 4/2009 | Hammad et al. |
| 2009/0150235 A1 | 6/2009 | Blythe |
| 2009/0176580 A1* | 7/2009 | Herrmann ............... G06Q 30/02 463/43 |
| 2009/0192890 A1 | 7/2009 | Steinkamp et al. |
| 2009/0198572 A1* | 8/2009 | Jurgens .................. G06Q 30/02 705/14.25 |
| 2009/0271262 A1 | 10/2009 | Hammad |
| 2009/0292595 A1 | 11/2009 | Tonnison et al. |
| 2009/0307118 A1 | 12/2009 | Baumgartner, IV |
| 2009/0307130 A1 | 12/2009 | Tan |
| 2010/0021146 A1 | 1/2010 | Murai et al. |
| 2010/0030688 A1 | 2/2010 | Patterson |
| 2010/0042517 A1 | 2/2010 | Paintin et al. |
| 2010/0051691 A1 | 3/2010 | Brooks et al. |
| 2010/0057551 A1* | 3/2010 | Blaisdell ............... G06Q 20/387 705/14.27 |
| 2010/0057553 A1* | 3/2010 | Ameiss .................. G06Q 30/02 705/14.32 |
| 2010/0070376 A1 | 3/2010 | Proud et al. |
| 2010/0075638 A1 | 3/2010 | Carlson et al. |
| 2010/0076820 A1 | 3/2010 | Davis |
| 2010/0082480 A1 | 4/2010 | Korosec |
| 2010/0100484 A1 | 4/2010 | Nguyen et al. |
| 2010/0106598 A1 | 4/2010 | Grimes |
| 2010/0125737 A1 | 5/2010 | Kang |
| 2010/0145855 A1 | 6/2010 | Fordyce, III et al. |
| 2010/0161404 A1 | 6/2010 | Taylor et al. |
| 2010/0174596 A1 | 7/2010 | Gilman et al. |
| 2010/0211445 A1* | 8/2010 | Bodington ............. G06Q 40/02 705/14.28 |
| 2010/0211469 A1 | 8/2010 | Salmon et al. |
| 2010/0223145 A1 | 9/2010 | Dragt |
| 2010/0274626 A1 | 10/2010 | Carlson |
| 2010/0274659 A1 | 10/2010 | Antonucci et al. |
| 2010/0280892 A1 | 11/2010 | Uzunalioglu et al. |
| 2010/0291895 A1 | 11/2010 | Drzyzga et al. |
| 2010/0299194 A1 | 11/2010 | Snyder et al. |
| 2010/0306032 A1 | 12/2010 | Jolley |
| 2010/0312626 A1 | 12/2010 | Cervenka |
| 2010/0312631 A1 | 12/2010 | Cervenka |
| 2010/0312632 A1 | 12/2010 | Cervenka |
| 2010/0312633 A1 | 12/2010 | Cervenka |
| 2010/0312634 A1 | 12/2010 | Cervenka |
| 2010/0312635 A1 | 12/2010 | Cervenka |
| 2011/0022448 A1* | 1/2011 | Strock ................ G06Q 30/0241 705/14.1 |
| 2011/0022514 A1 | 1/2011 | Lal et al. |
| 2011/0035278 A1 | 2/2011 | Fordyce, III et al. |
| 2011/0047019 A1 | 2/2011 | Cervenka et al. |
| 2011/0066483 A1 | 3/2011 | Salmon et al. |
| 2011/0082739 A1 | 4/2011 | Pourfallah |
| 2011/0087530 A1 | 4/2011 | Fordyce, III et al. |
| 2011/0087531 A1 | 4/2011 | Winters et al. |
| 2011/0125565 A1 | 5/2011 | MacIlwaine et al. |
| 2011/0145148 A1 | 6/2011 | Hammad |
| 2011/0161230 A1 | 6/2011 | Singh |
| 2011/0191417 A1 | 8/2011 | Rathod |
| 2011/0218868 A1 | 9/2011 | Young et al. |
| 2011/0231258 A1 | 9/2011 | Winters |
| 2011/0238483 A1 | 9/2011 | Yoo et al. |
| 2011/0276493 A1 | 11/2011 | Graham, III et al. |
| 2011/0276495 A1 | 11/2011 | Varadarajan et al. |
| 2011/0288918 A1 | 11/2011 | Cervenka et al. |
| 2011/0288924 A1 | 11/2011 | Thomas et al. |
| 2011/0295675 A1 | 12/2011 | Reodica |
| 2012/0010940 A1 | 1/2012 | Masi |
| 2012/0016728 A1 | 1/2012 | Ahmad et al. |
| 2012/0035998 A1* | 2/2012 | Chien ................ G06Q 30/0267 705/14.17 |
| 2012/0041812 A1* | 2/2012 | Postrel ............... G06Q 30/0226 705/14.27 |
| 2012/0054000 A1 | 3/2012 | Boppert et al. |
| 2012/0101881 A1 | 4/2012 | Taylor et al. |
| 2012/0101894 A1 | 4/2012 | Sterling et al. |
| 2012/0123849 A1* | 5/2012 | Armstrong ............. G06Q 40/04 705/14.33 |
| 2012/0130705 A1 | 5/2012 | Sun et al. |
| 2012/0150669 A1 | 6/2012 | Langley et al. |
| 2012/0179531 A1 | 7/2012 | Kim |
| 2012/0191525 A1 | 7/2012 | Singh et al. |
| 2012/0215610 A1 | 8/2012 | Amaro et al. |
| 2012/0215614 A1 | 8/2012 | Hochstatter et al. |
| 2012/0215624 A1 | 8/2012 | Ramer et al. |
| 2012/0215638 A1 | 8/2012 | Bennett et al. |
| 2012/0221446 A1 | 8/2012 | Grigg et al. |
| 2012/0226545 A1 | 9/2012 | Gebb et al. |
| 2012/0226604 A1 | 9/2012 | Isaacson et al. |
| 2012/0239477 A1 | 9/2012 | Cueli et al. |
| 2012/0245987 A1 | 9/2012 | Isaacson et al. |
| 2012/0267432 A1 | 10/2012 | Kuttuva |
| 2012/0271689 A1 | 10/2012 | Etheredge et al. |
| 2012/0271691 A1 | 10/2012 | Hammad et al. |
| 2012/0271697 A1 | 10/2012 | Gilman et al. |
| 2012/0290420 A1 | 11/2012 | Close |
| 2012/0290950 A1 | 11/2012 | Rapaport et al. |
| 2012/0303425 A1 | 11/2012 | Katzin et al. |
| 2012/0316945 A1 | 12/2012 | Wolf et al. |
| 2012/0323663 A1 | 12/2012 | Leach |
| 2013/0006848 A1 | 1/2013 | Kuttuva |
| 2013/0054336 A1 | 2/2013 | Graylin |
| 2013/0060679 A1 | 3/2013 | Oskolkov et al. |
| 2013/0091000 A1 | 4/2013 | Hagey et al. |
| 2013/0124278 A1 | 5/2013 | Najm |
| 2013/0124287 A1 | 5/2013 | Bjorn et al. |
| 2013/0132283 A1 | 5/2013 | Hayhow et al. |
| 2013/0151323 A1 | 6/2013 | Shepard et al. |
| 2013/0151401 A1 | 6/2013 | Scipioni et al. |
| 2013/0197991 A1 | 8/2013 | Basu et al. |
| 2013/0246150 A1 | 9/2013 | Ovick et al. |
| 2013/0246273 A1 | 9/2013 | Ovick et al. |
| 2013/0254004 A1 | 9/2013 | Cervenka et al. |
| 2013/0254008 A1 | 9/2013 | Ovick et al. |
| 2013/0268333 A1 | 10/2013 | Ovick et al. |
| 2013/0282586 A1 | 10/2013 | Ovick et al. |
| 2013/0325579 A1 | 12/2013 | Salmon et al. |
| 2013/0339167 A1 | 12/2013 | Taylor et al. |
| 2013/0346191 A1 | 12/2013 | Morris et al. |
| 2014/0040051 A1 | 2/2014 | Ovick et al. |
| 2014/0040135 A1 | 2/2014 | Ovick et al. |
| 2014/0046744 A1 | 2/2014 | Hagey |
| 2014/0129308 A1 | 5/2014 | Rappoport |
| 2014/0129314 A1 | 5/2014 | Kim |
| 2014/0229260 A1 | 8/2014 | Cervenka et al. |

(56) References Cited

U.S. PATENT DOCUMENTS

| | | | |
|---|---|---|---|
| 2014/0310080 A1 | 10/2014 | Salmon et al. | |
| 2015/0019314 A1 | 1/2015 | Salmon et al. | |
| 2015/0106185 A1 | 4/2015 | Cervenka et al. | |

FOREIGN PATENT DOCUMENTS

| | | | | |
|---|---|---|---|---|
| JP | 2002269423 | A | 9/2002 | |
| JP | 2003502763 | A | 1/2003 | |
| JP | 2004038812 | A | 2/2004 | |
| JP | 2004303015 | A | 10/2004 | |
| JP | 2006143473 | A | 6/2006 | |
| KR | 20010083521 | A | 9/2001 | |
| KR | 20010096673 | A | 11/2001 | |
| KR | 20020050219 | A | 6/2002 | |
| KR | 20030080111 | A | 10/2003 | |
| KR | 1020040016771 | A | 2/2004 | |
| KR | 20040028110 | A | 4/2004 | |
| KR | 1020040040253 | A | 5/2004 | |
| KR | 1020040077077 | A | 9/2004 | |
| KR | 1020050061661 | A | 6/2005 | |
| KR | 20060101241 | A | 9/2006 | |
| KR | 100717590 | B1 | 5/2007 | |
| KR | 1020070110241 | A | 11/2007 | |
| KR | 100836484 | B1 | 6/2008 | |
| KR | 1020080102439 | A | 11/2008 | |
| MX | PA1013136 | | 6/2004 | |
| WO | 0049551 | A1 | 8/2000 | |
| WO | 0079461 | A1 | 12/2000 | |
| WO | WO-0179966 | A2 * | 10/2001 | ............. G06Q 20/04 |
| WO | WO-2006018856 | A2 * | 2/2006 | ........... G06Q 20/387 |
| WO | 2006121541 | A1 | 11/2006 | |
| WO | 2008016923 | A2 | 2/2008 | |
| WO | 2008102935 | A1 | 8/2008 | |
| WO | 2009061019 | A1 | 5/2009 | |
| WO | 2010093893 | A2 | 8/2010 | |
| WO | 2010135642 | A2 | 11/2010 | |
| WO | 2011028486 | A2 | 3/2011 | |
| WO | 2013138756 | A1 | 9/2013 | |
| ZA | 200200475 | B | 6/2003 | |

OTHER PUBLICATIONS

Crawford, B. (2005). New methods of payment and new forms of money. Banking & Finance Law Review, 20(3), 393-409. Retrieved from https://www.proquest.com/scholarly-journals/new-methods-payment-forms-money/docview/218867524/se-2 (Year: 2005).*
International Patent Application PCT/US2010/024057, International Search Report & Written Opinion, dated Sep. 28, 2010.
International Patent Application PCT/US2010/035769, International Search Report and Written Opinion, dated Jan. 12, 2011.
International Patent Application PCT/US2010/037646, International Search Report and Written Opinion, dated Jan. 18, 2011.
International Patent Application PCT/US2010046360, International Search Report and Written Opinion, dated Mar. 30, 2011.
International Patent Application PCT/US2012/059607, International Search Report and Written Opinion, dated Mar. 15, 2013.
International Patent Application PCT/US2012/068541, International Search Report and Written Opinion, dated Mar. 20, 2013.
International Patent Application PCT/US2013/023642, International Search Report and Written Opinion, dated May 30, 2013.
International Patent Application PCT/US2013/032307, International Search Report and Written Opinion, dated Jun. 26, 2013.
International Patent Application PCT/US12/59607, International Preliminary Report on Patentability, dated Apr. 15, 2014.
International Patent Application PCT/US12/68541, International Preliminary Report on Patentability, dated Jun. 10, 2014.
International Patent Application PCT/US13/23642, International Preliminary Report on Patentability, dated Aug. 5, 2014.

* cited by examiner

POINT OF INTERACTION LOYALTY CURRENCY REDEMPTION IN A TRANSACTION

RELATED APPLICATIONS

The present application is a continuation application of U.S. patent application Ser. No. 16/545,394, filed Aug. 20, 2019, and entitled "Point of Interaction Loyalty Currency Redemption in a Transaction", which is a continuation of U.S. patent application Ser. No. 15/632,098, filed Jun. 23, 2017, now issued as U.S. Pat. No. 10,430,774 on Oct. 1, 2019, and entitled "Point of Interaction Loyalty Currency Redemption in a Transaction," which is a continuation of U.S. patent application Ser. No. 12/704,445, filed Feb. 11, 2010, and entitled "Point of Interaction Loyalty Currency Redemption in a Transaction", now issued as U.S. Pat. No. 9,721,238 on Aug. 1, 2017, which claims the benefit of the filing date of Prov. U.S. Pat. App. Ser. No. 61/152,614, filed Feb. 13, 2009, and entitled "Point of Interaction Rewards Redemption Service", the entire disclosures of which applications are hereby incorporated herein by reference.

FIELD OF THE TECHNOLOGY

The present application is related to loyalty currency held by a consumer, and is more particularly related to loyalty currency used by a consumer to tender payment to a merchant for a transaction.

BACKGROUND

It is desirable for a consumer to execute transactions for goods or services using one or more payment accounts, where each account includes monetary funds in a financial currency, loyalty currency or other non-monetary credits or tokens sufficient to cover the expense of executing the transaction. The present disclosure addresses this need.

SUMMARY OF THE DESCRIPTION

The present application discloses methods for tendering a transaction amount in a financial currency for a transaction between a consumer and a merchant. In one implementation, multiple different non-financial loyalty currencies held by different loyalty issuers are used by a consumer as financial tender for a transaction with a merchant. Each loyalty issuer pays to a primary issuer an equivalent financial currency value of the non-financial loyalty currency being held in return for a corresponding reduction of the balance of non-financial loyalty currency. For each reduced balance, the primary issuer: (i) adds an equivalent primary loyalty currency value to a primary loyalty account for the consumer; (ii) sends, for delivery to the merchant, the financial currency value to pay for the transaction; and (iii) makes an equivalent reduction in the balance of the primary loyalty currency. The equivalent financial currency value of the non-financial loyalty currency paid by each loyalty issuer to the primary issuer can be dependent upon predetermined criteria designating whether the merchant in the transaction is a competitor of the loyalty issuer.

In another implementation, the consumer will have a plurality of account balances in different loyalty currencies in respective loyalty accounts, where each loyalty account was issued to the consumer by a corresponding issuer. The consumer can pay a loyalty portion of the transaction amount by using the consumer's accumulated loyalty currencies. To do so, each of the loyalty accounts to be so used can be treated as follows: (i) At least a portion of the account balance in the loyalty currency of the loyalty account is converted into an amount of a primary loyalty currency, where the converted portion has an equivalent amount in the financial currency; (ii) The equivalent amount in the financial currency corresponding to the converted portion is collected from the issuer of the loyalty account, and the equivalent amount is added to a financial currency account issued to the consumer by an issuer; (iii) A deduction of the converted portion is made from the account balance of the loyalty account; and (iv) an addition is made to a primary loyalty account issued to the consumer by an issuer in the amount of the primary loyalty currency that corresponds to the converted portion.

When the account balance in the primary loyalty currency of the primary loyalty account has an equivalency in the financial currency that is not less than the loyalty portion of the transaction amount in the financial currency, then several steps can be taken as follows: (i) a deduction is made of the loyalty portion of the transaction amount in the financial currency from the account balance in the financial currency account; (ii) a deduction is also made from the account balance of the primary loyalty currency account that is an equivalent amount in the primary loyalty currency corresponding to the loyalty portion of the transaction amount in the financial currency; and (iii) a tender is made of the loyalty portion of the transaction amount in the financial currency for delivery to the merchant.

In order to pay the full transaction amount to the merchant, another deduction can be made from the financial currency account, where the deduction is the difference between the transaction amount and the loyalty portion thereof. The difference can be tendered for delivery to the merchant. Payments from the consumer to the merchant can be processed in an open system payment processing network.

In yet another implementation, a consumer can control the use of loyalty currencies to pay a merchant for a transaction. To do so, the consumer registers each loyalty account for use as financial currency. The registration can be made by the consumer's use of a web enabled client. Data from the registration process is received as a plurality of identifiers for a respective plurality of accounts each being issued by an issuer to the consumer. Each such account can have an account balance in a currency that is either a financial or non-financial currency. A primary account balance of a primary account will be in a primary non-financial currency. The consumer will specify in a transaction with a merchant a redemption amount of the transaction amount that the consumer wishes pay from the consumer's accumulated loyalty currencies. Once received from the consumer (e.g.; sent by a Point of Interaction or Point of Service terminal of the merchant), the redemption amount of the financial currency is collected from the consumer's various loyalty account in different loyalty currencies.

By way of example, until the amount of the non-financial currency in the primary account balance of the primary account is equivalent to an amount that is not less than the redemption amount, each of the consumer's loyalty accounts can be processes as follows: (i) the account balance in the non-financial currency of the account is retrieved, as well as a conversion factor that can be used to convert the account balance in the non-financial currency into the primary non-financial currency; (ii) an amount of the primary non-financial currency is derived from the non-financial currency in account balance in the account; (iii) the derived amount of the primary non-financial currency is added to the primary account balance in the primary account, and (iv) the conversion factor is used to derive an amount of the financial currency equivalent to the primary non-financial currency in the primary account.

When the amount of the non-financial currency in the primary account is equivalent to an amount that is not less than the redemption amount, then an acknowledgement can be sent. The acknowledgment can include a notice that the primary account has a balance that is sufficient for the redemption amount in the financial currency.

A merchant may provide the consumer with a loyalty currency deposit into a loyal account specifically because the consumer has conducted a transactions with the merchant. In one implementation, when the consumer attempts to use that loyalty currency to conduct a transaction with a competitor of the merchant, predetermined criteria may be used to devalue the loyalty currency for such use. The predetermined criteria may specify that the amount by which the loyalty currency is devalued may be specific to each competitor, or may be at a set conversion ratio for any competitor of the merchant. Accordingly, information accumulated about each transaction being conducted by the consumer with a competitor, where the loyalty currency is being used, may include an identifier for the competitor. The identifier can then be used, with the predetermined criteria, to assess the loyalty currency devaluation or absence thereof.

Addition information can also be accumulated about a transaction being conducted by a consumer with a merchant where one or more different loyalty currencies are being used to pay the merchant for the transaction. The additional information can include product level data (e.g.; Universal Product Codes, Stock Keeping Units, Serial Numbers, unique identifiers for items being purchased in the transaction by the consumer, etc.) Product level data can also be used, with other predetermined criteria, to assess loyalty currency devaluation, increased valuation, and absence of devaluation. Each such valuation can be applied on an item-by-item basis according to those items being purchased by the consumer in a transaction where one or more different loyalty currencies are being used to pay a merchant for the transaction. Valuations of different loyalty currencies can also be specified in predetermined criteria on the basis of: (i) the identity of the merchant in a transaction as being a competitor or non-competitor of another merchant that provided the loyalty currency from past transactions with the consumer; (ii) an item-by-item basis of items being purchased in the transaction; and (iii) combinations of the foregoing.

BRIEF DESCRIPTION OF THE DRAWINGS

Implementations discussed herein will become more apparent from the detailed description set forth below when taken in conjunction with the drawings, in which like elements bear like reference numerals.

DETAILED DESCRIPTION

In one implementation, a transaction is paid for, at least in part, from one or more customer accounts having monetary funds, loyalty currency, other non-monetary credits or a combination thereof. During the transaction, a monetary value is assigned to the loyalty currency or other non-monetary credits that is ultimately used as tender to pay for the transaction. If the transaction is authorized, a corresponding amount of loyalty currency or non-monetary credits is first made unavailable from the one or more customer accounts, which is later removed from the one or customer accounts via clearing and settlement.

Figure 1:
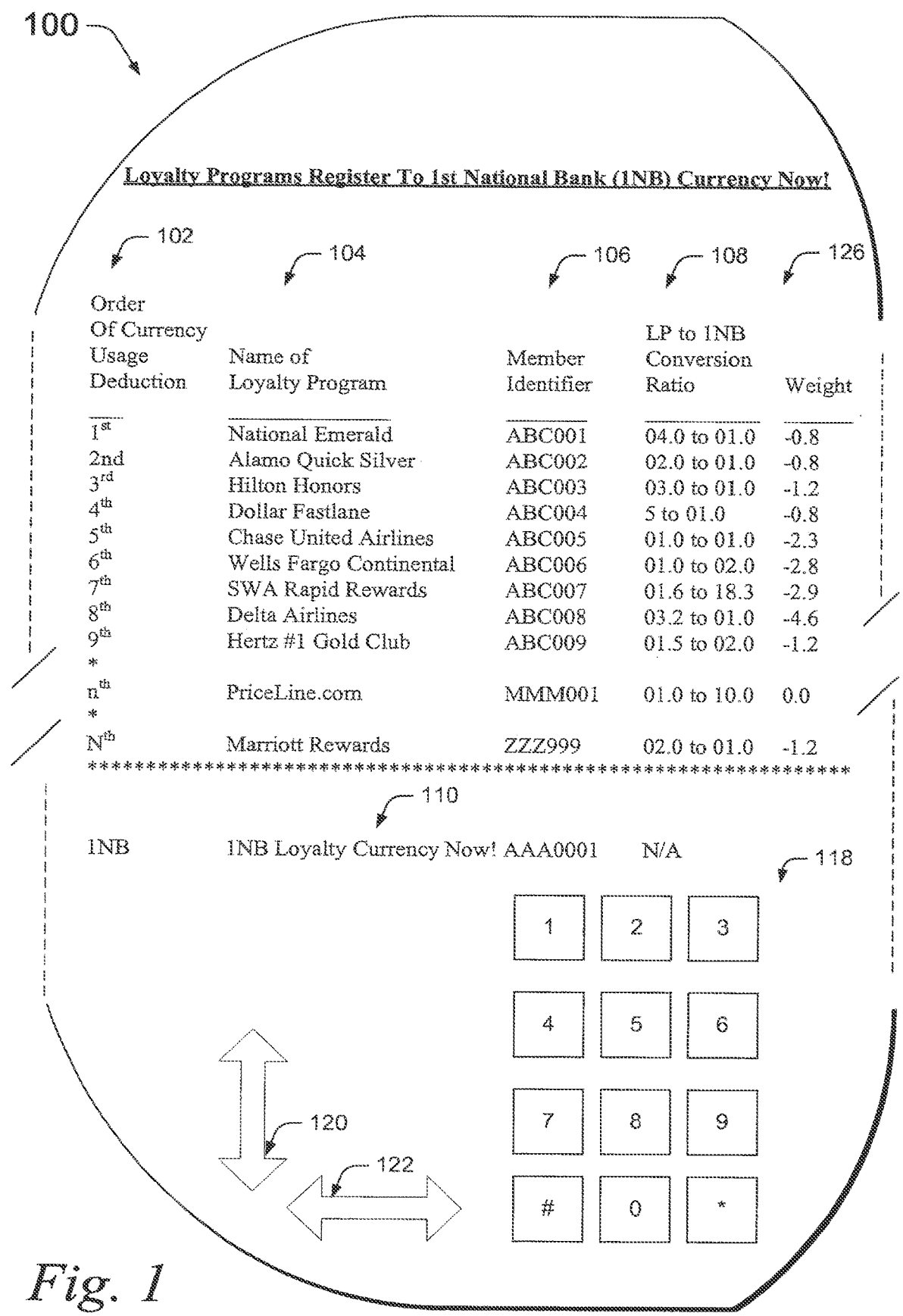
FIGS. 1-3 and 6 are respective exploded views of display screens featuring exemplary screen shots for rending on one or more display devices.
Figure 13:
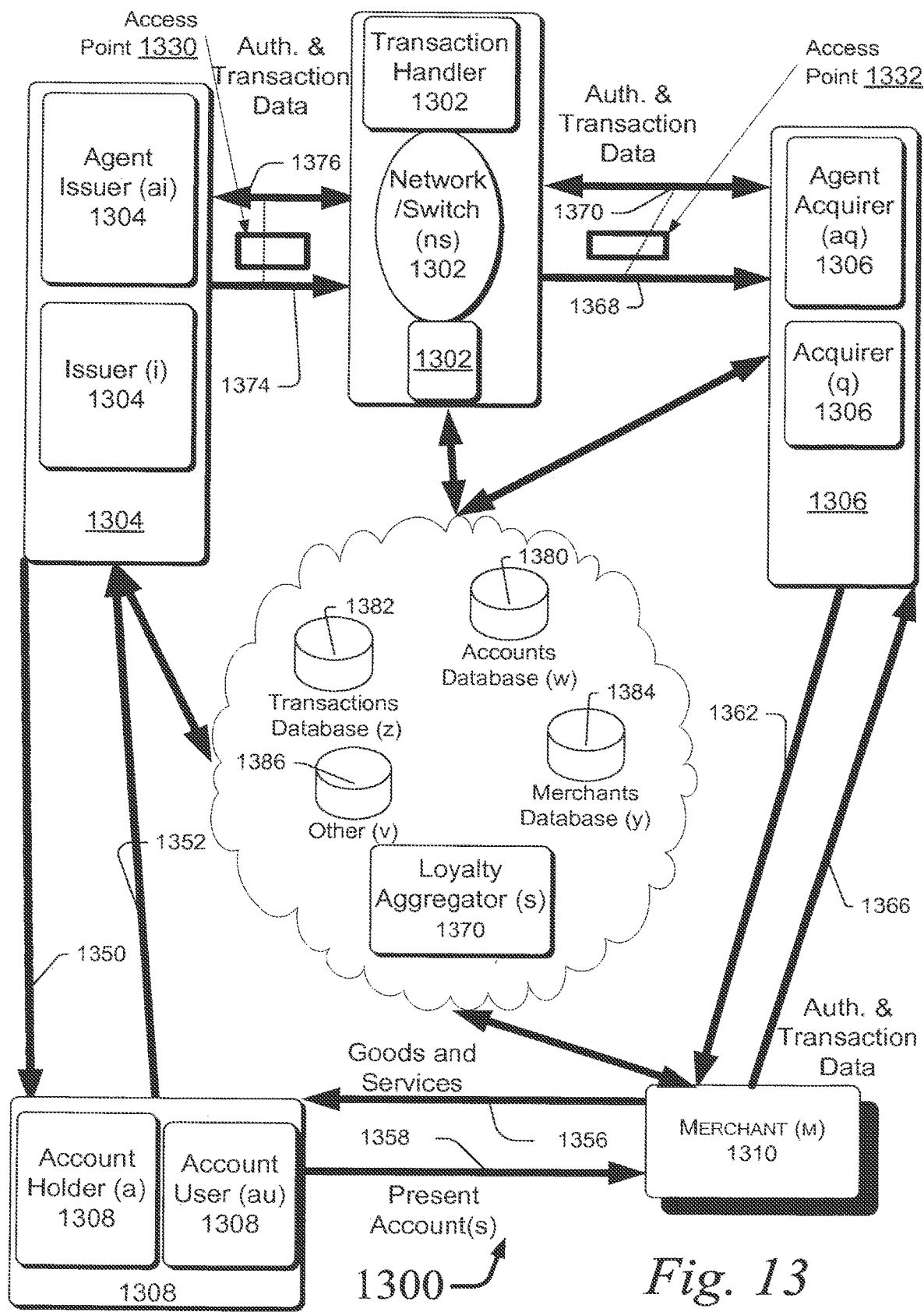
FIG. 13 illustrates an exemplary payment processing network, the processing network includes a transaction handler to facilitate the transfer of transaction information between one or more issuers and one or more acquirers.
Figure 14:
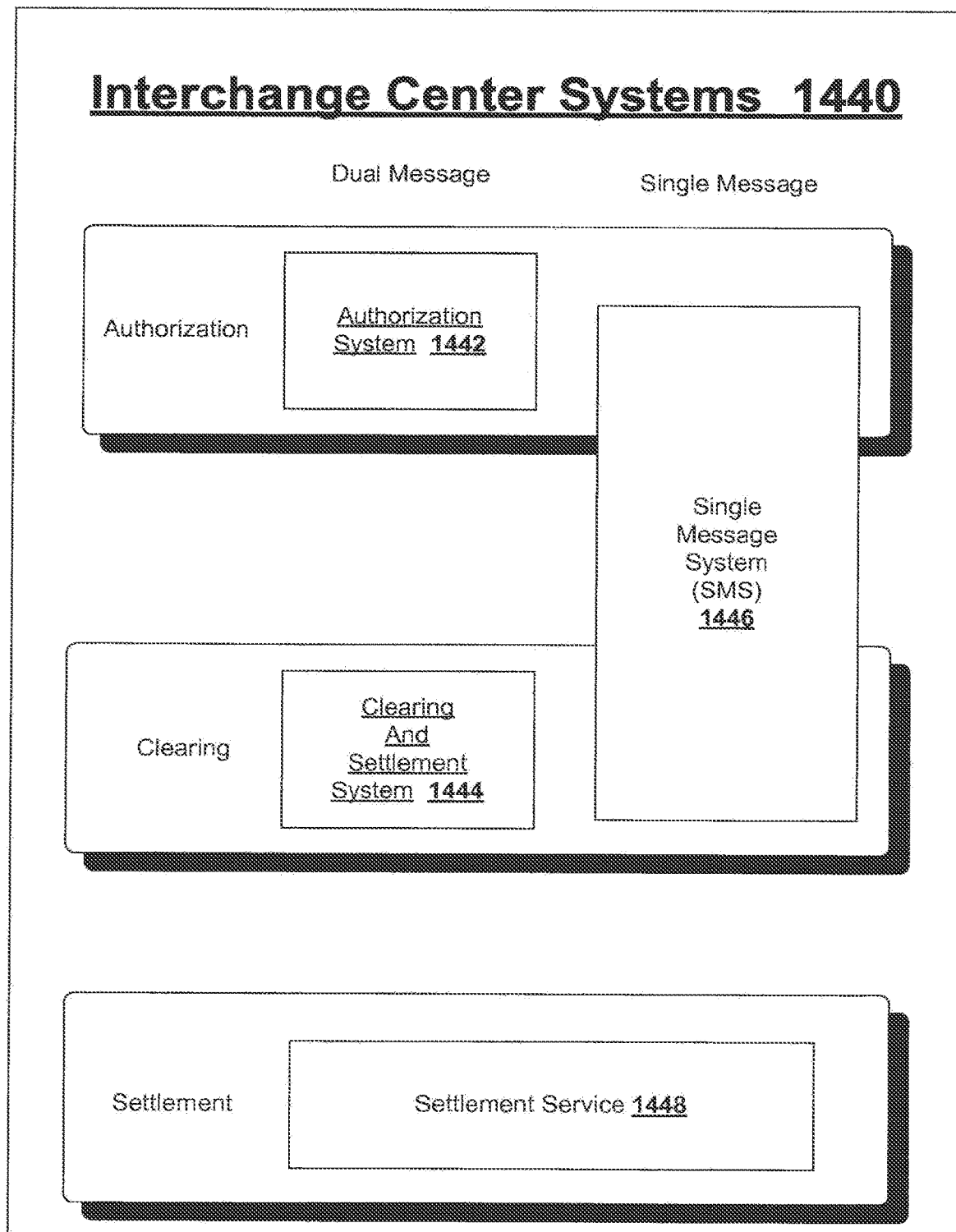
FIG. 14 illustrates systems housed within an interchange center to provide online and offline transaction processing for transactions conducted using the payment processing network of FIG. 13.
Figure 15:
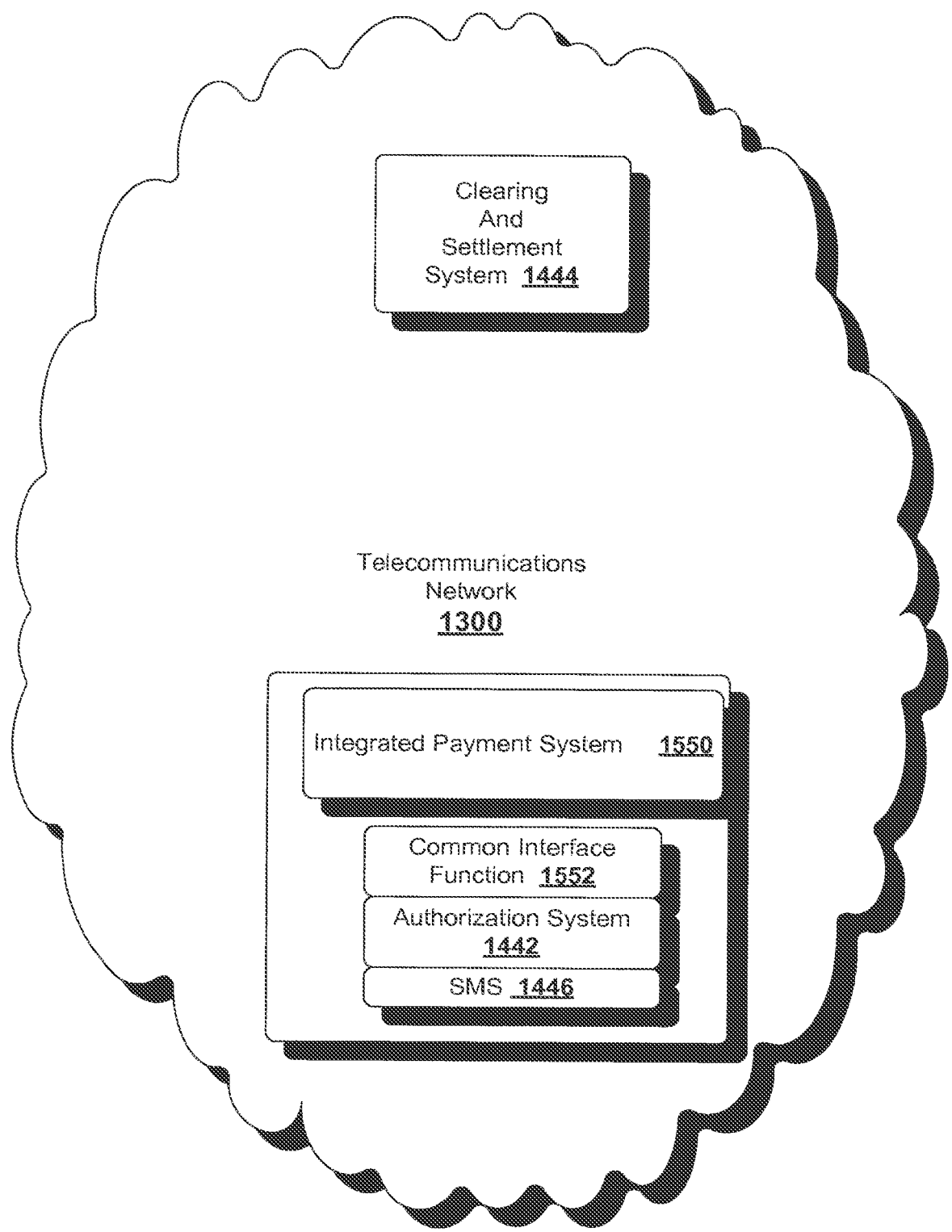
FIG. 15 illustrates another view of the components of FIGS. 13 and 14.

In another implementation, a transaction can feature a point of interaction loyalty currency redemption that is facilitated by hardware executing software in a payment processing network more fully described in reference to FIGS. 13 through 15. A web enabled client can interact with one or more servers to facilitate the redemption. By of example, FIG. 1 depicts a display screen 100, in the exploded view thereof. Display screen 100 features a screen-shot by which a user (e.g.; an account user (au) 1308) can enter information about loyalty programs in order to register those loyalty programs with an issuer to whom the user has been issued both a financial currency account and a non-financial loyalty program currency account. In this case, the loyalty program currency account and the financial currency account have been issued to the user by First National Bank (1NB). As seen in column 104, several rows of loyalty programs are listed in respective order of column 102. The order of column 102 is to be the order that loyalty programs are used for financial currency in a transaction. Column 104 shows the member identifier for each respective loyalty program in each row. Column 108 shows the respective conversion rate of the loyalty program in the row to the loyalty program of First National Bank. For example, the loyalty program Alamo Quicksilver will convert 2 points into 1 point of loyalty currency in the First National Bank Loyalty Program. By way of another example, Priceline.Com will convert 1 point in its loyalty program currency to 1 point in the First National Bank Loyalty Program Currency. Note that reference numeral 110 indicates that the name of the First National Bank Loyalty Program is "1 NC Loyalty Currency Now!"

Also seen in Display Screen 100 of FIG. 1 is a column 126, which lists for each row, a weighting factor. The weighting factor will be used whenever loyalty currency is used from one loyalty account to make a purchase from a merchant that is a competitor of another merchant that funded or otherwise supplied the loyalty currency being used to pay for the transaction with the competitor. For example, an automobile rental company may disfavor the usage of its loyalty points currency to rent an automobile at a competing automobile rental agency. Similarly, a hotel may disfavor the use of its loyalty program currency to pay for a hotel stay at a competing hotel chain. An airline may disfavor the use of its loyalty program currency to make a purchase for airfare on another competing airline. The weighting factor can be used to devalue the merchant supplied loyalty currency when used to pay for a transaction with that merchant's competitor. Accordingly, whenever such usage of loyalty currencies are being employed, a weighting may be applied to the conversion ratio such that more loyalty points will be required to make a purchase at a competitor than would be used to make a purchase at a non-competing merchant. Note, however, that the weighting is an optional choice of the processes described and enabled by this application. The weighting factor can be set up by predetermined criteria negotiated between the issuer of the loyalty program currency and the loyal program of the issuer that will be processing payments to the merchant. By way of example, the issuer being used to process payments to the merchant here is First National Bank through its 1NB Currency Now! loyalty program.

Display screen 100 is controlled by the user through a vertical manipulation icon 120, a horizontal manipulation icon 122 and a keypad 118 which may be a virtual keypad.

The user is able to set up, using display screen 100, the order, via column 102, in which loyalty programs currencies will be used from respective loyalty programs of which the user is a member. Thus, the first loyalty program, here 'National Emerald', will be the first loyalty program from which financial loyalty program currency is deducted when that loyalty program's currency is used to conduct a financial currency transaction.

Figure 9:
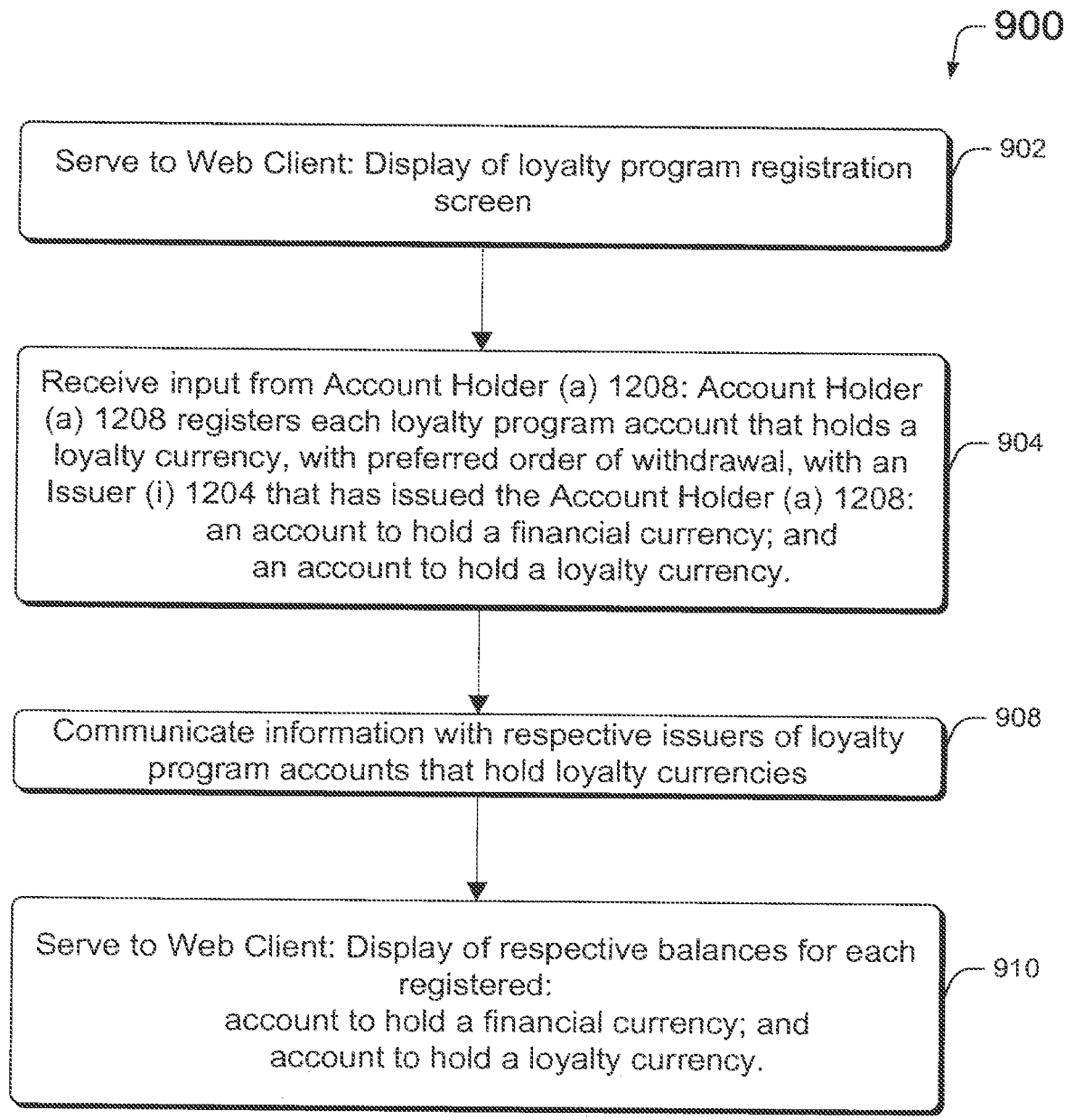

In reference to FIG. 13, FIG. 1 corresponds to FIG. 9 which depicts a process 900 by which a user uses a web-enabled client in order to register memberships in various loyalty programs with a primary loyalty program for the use of loyalty program currency to conduct financial currency transactions. In a step 902, a web-enabled client is used by the user to navigate to a web site for the display of a loyalty program registration screen, for example, display screen 100 seen in FIG. 1. In step 904, input is received via display screen 100 from the user, who may be Account Holder (a) 102. Account Holder (a) 1208 registers each loyalty program account that holds a loyalty currency, in the preferred order of withdrawal there from as seen in column 102 of FIG. 1, with Issuer (i) 1204 that has issued the Account Holder (a) 1208 both: an account to hold a financial currency as well as a primary account to hold a primary loyalty currency. Thus, the First National Bank is the issuer of the primary loyalty account as well as the financial currency account, where First National Bank, or an agent thereof, is being used to register all of the loyalty programs of the Account Holder (a) 1208.

In step 908, the information entered by the Account Holder (a) 1208 is sent to the necessary parties in order to register each loyalty program with the First National Bank to communicate information about the respective loyalty program currencies for each loyalty program, as well as any other information necessary to facilitate the processes described and enabled as set forth herein.

In step 910, a web page is served to the web-enabled client whereby respective balances for each of the registered loyalty programs are displayed to the user. This display may include the account that holds the financial currency as well and the balance thereof, along with the balance of each account that holds the loyalty currencies from the respective loyalty programs upon conversion thereof. Such a display may be by way of enhancements to display screen 100, where the member identifier column 106 can be is replaced with respective balances in each of the respective accounts seen in column 104.

Figure 2:
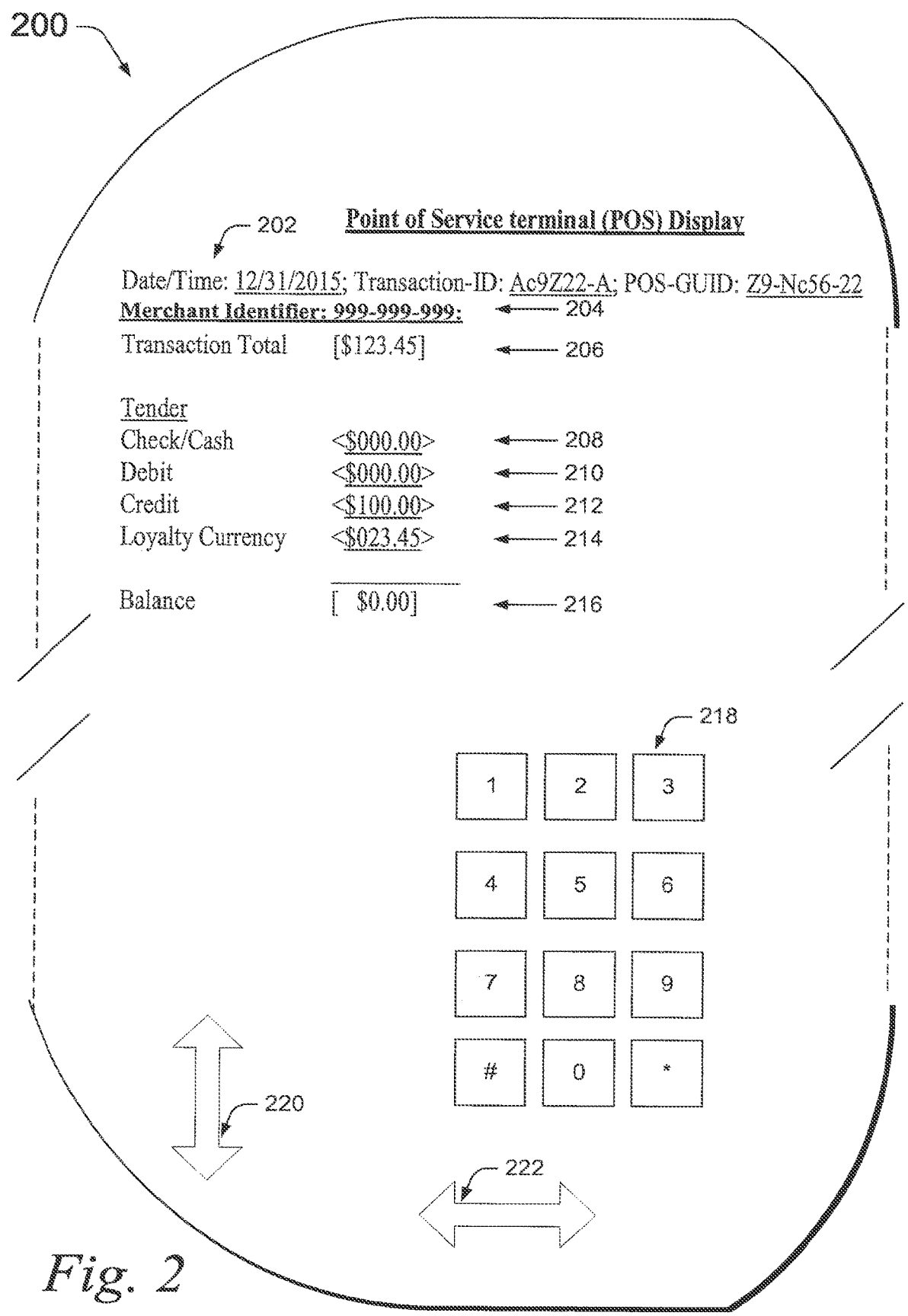

FIG. 2 shows an exemplary display screen 200, in exploded view thereof, which is seen on a Point of Service terminal (POS) at the point of interaction during a transaction between a merchant and an Account Holder (a) 1308. Seen at reference numeral 202, specific information about a transaction being conducted is rendered, where the date and time is indicated, a particular identifier for the transaction is indicated, a particular globally unique identifier for the POS is indicated, as well as a specific identifier for the merchant conducting the transaction which is seen at reference numeral 204. The total amount of the transaction is seen at reference numeral 206.

In order to satisfy payment for the transaction total seen at reference terminal 206, various tenders are made by the consumer in order to pay for the transaction. As seen at reference numerals 208 and 210, respectively, cash and check, as well as debit tenders can be made. Reference numeral 212 indicates that a credit account is being used to pay $100 toward the transaction total of $123.45. Reference numeral 214 indicates that loyalty currency will be used in the amount of $23.45 toward the transaction total seen at reference numeral 206. Reference numeral 216 indicates that the balance is $0.00 after the foregoing tenders have been made toward the transaction total $123.45. A vertical navigational icon 220 and a horizontal navigational icon 222 are seen, as well as a virtual keypad 218.

Figure 10:
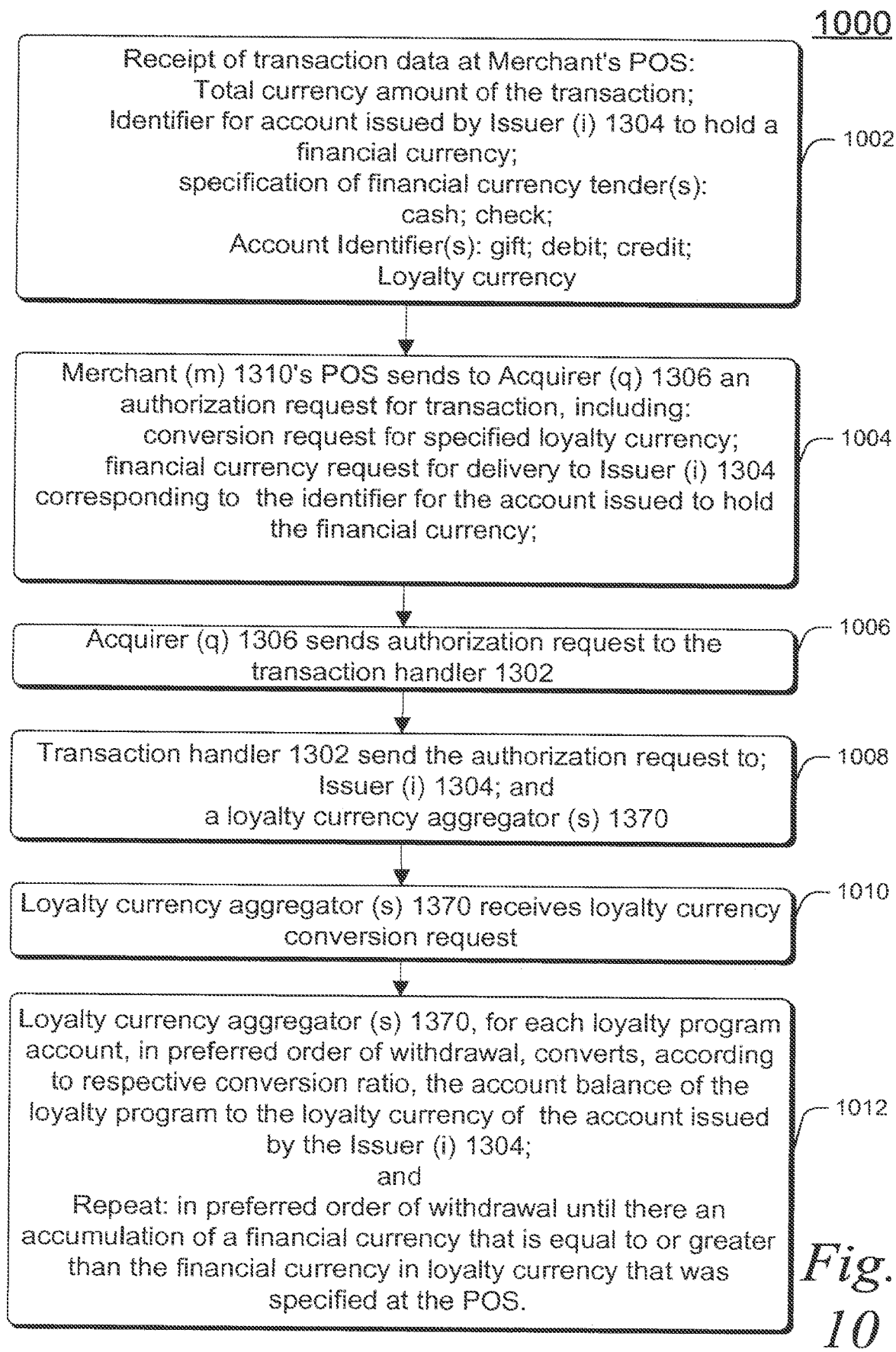

FIG. 2 is further described in a process 1000 seen in FIG. 10. Process 1000 begins with step 1002, in which transaction data is received at a merchant's POS. These data include the total currency amount of the transaction, and an identifier for an account issued by issuer (i) 1302, where that account holds a financial currency. Also received at the merchant's POS are various specifications, and various financial currency tenders, including cash, check, gift cards, debit accounts, and credit accounts. Further, there is received in the transaction data at the merchant's POS certain loyalty currencies in a financial currency expression thereof, which are to be converted in order to satisfy the payment of the transaction at the POS.

At step 1004, process 1000, merchant (m) 1310's POS sends to Acquirer (q) 1306, an authorization request for the transaction. This authorization request will include a request to convert on or more currencies of respective specified loyalty currencies. It will also include a financial currency request for delivery to Issuer (i) 1304 corresponding to the identifier for the account issued to hold the financial currency. By way of example of step 1004, the display seen in display screen 200 represents information that may be included in the authorization request. In particular, the reference numeral 214 indicates that a total of $23.45 is to be derived from one or more loyalty programs that the Account Holder is a member of in order to satisfy the transaction total 206.

Step 1004 of process 1000 involves the Acquirer (q) 1306 sending an authorization request to the transaction handler 1302 upon receipt of same. By way of example, and not by way of limitation, reference numerals used in FIG. 10 correspond to the block level diagram seen in FIG. 13 as more fully explained below.

At step 1008 of process 1000, the transaction handler of 1302 sends the authorization request to the issuer 1304 and sends the authorization request to a loyalty currency aggregator (s) 1370. At step 1010 of process 1000, the loyalty currency aggregator (s) 1370 receives the loyalty currency conversion request as interpreted from the authorization request. At step 1012, the authorization request will be interpreted by the loyalty currency aggregator 1310 as being a loyalty currency conversion request as denoted at step 1010 of process 1000.

The loyalty currency aggregator 1370, for each loyalty program account, in the preferred order of withdrawal, converts, according to the respective conversion ratio, the account balance of the loyalty program to the loyalty currency of the account issued by the issuer (i) 1304. By way of example, display screen 100 shows the loyalty conversion ratio in column 108 as well as the order by which loyalty currency is withdrawn from respective loyalty currency programs respectively seen in columns 102 and 104.

In some cases, the merchant with whom the transaction being conducted is determinative of the particular conversion ratio being used to pay the loyalty currency, or the transaction currency. By way of example, display screen 200 shows a merchant identifier 204. In the event that the merchant is a competitor of the merchant at which the transaction is being conducted at the POS, as determined from a retrieval of predetermined criteria, then the loyalty currency ratio seen in column 108 of display screen 100 may be adjusted as shown. The reason for this adjustment may be that the predetermined criteria sets forth that loyalty currency used to pay a competitor will be less preferred by the merchant giving the loyalty currency. As such, the more loyalty currency will be used if the transaction using that currency is being conducted with a competitor of the merchant who supplied the loyalty currency. By way of example, a non-competitive currency ratio may be 1 to 1. However, if the currency is used at a competitor, then the currency ratio may be 10 to 1. As such, in order to use loyalty currency of a merchant with a competing merchant, instead of the consumer using 1 point of loyalty currency to conduct the transaction, 10 points of the merchant's loyalty currency will be needed to pay the competitor merchant.

In step 1012 of process 1000, the loyalty currency conversion ratio is applied (including optionally a factor for competitor merchants as described above) for each loyalty program in the order specified in column 102 of display screen 100 in order to satisfy the requested financial currency seen at reference numeral 214 of display screen 200. As such, each loyalty program is so applied, with respective conversion ratios, until there is a satisfaction of enough loyalty currency and financial currency seen in reference numeral 214. By way of example and not by way of limitation, display screen 300 shows the use of 5 different loyalty programs, and their respective currencies, in order to satisfy the amount of $23.45 seen in reference numeral 214 of FIG. 2. Also seen for the merchant identifier 304 in display screen 300 are various loyalty currency ratios in last column to the right hand side of FIG. 3. Table 308 of display screen 300 shows that the first loyalty program from which loyalty currency is to be deducted is the National Emerald Loyalty Program. This order corresponds to the first row of column 102 in display screen 100. A currency of 40 is used from the National Emerald Loyalty Program with a conversion ratio of 4 to 1 in order to vest 10 points or 10 loyalty currency points into the First National Bank Loyalty Program, which is called "1NB Currency Now!" The next loyalty program that is to be used to deduct currency is the Alamo Quicksilver Loyalty Program from which 10 points are to be deducted in a 2 to 1 ratio to vest 5 points in the 1NB Currency Now! Loyalty Program. The third loyalty program from which loyalty currency is to be deducted is the Hilton Honors program from which 9 points are to be deducted at a 3 to 1 ratio to vest 3 points into the 1NB Currency Now! loyalty program. Continuing, the Dollar Fast Lane loyalty program is to have a deduction of 10 loyalty points at a ratio of 5 to 1 to vest 2 points into the 1NB Currency Now! loyalty program currency. Finally, the Chase United Airlines Loyal Program is to have a deduction of 4 loyalty points at a 1 to 1 ratio to deposit 4 loyalty points into the 1NB Currency Now Loyalty Program.

As seen from table 308, a total of 24 points are to be deposited into the 1NB Currency Now! Loyalty Program. There is an option seen just below table 308 for the user to agree or not to agree with this particular sequence of deductions, and respective amounts thereof, from 5 different loyalty programs for a total of 24 loyalty programs deposited into the 1NB Currency Now! loyalty program. The user has the option to accept or reject this table 308 presentation. Note, however, that display screen 300 is an optional display screen which, rather than be used by a user, may be automatically skipped, assuming predetermined criteria that disallows the user's ability to deselect any of the deductions as seen in table 308. As in display screens 100 and 200, display screen 300 includes a vertical navigation icon 310, a horizontal navigation icon 322 and a virtual keypad 318 in the exploded view of display screen 300.

Figure 4:
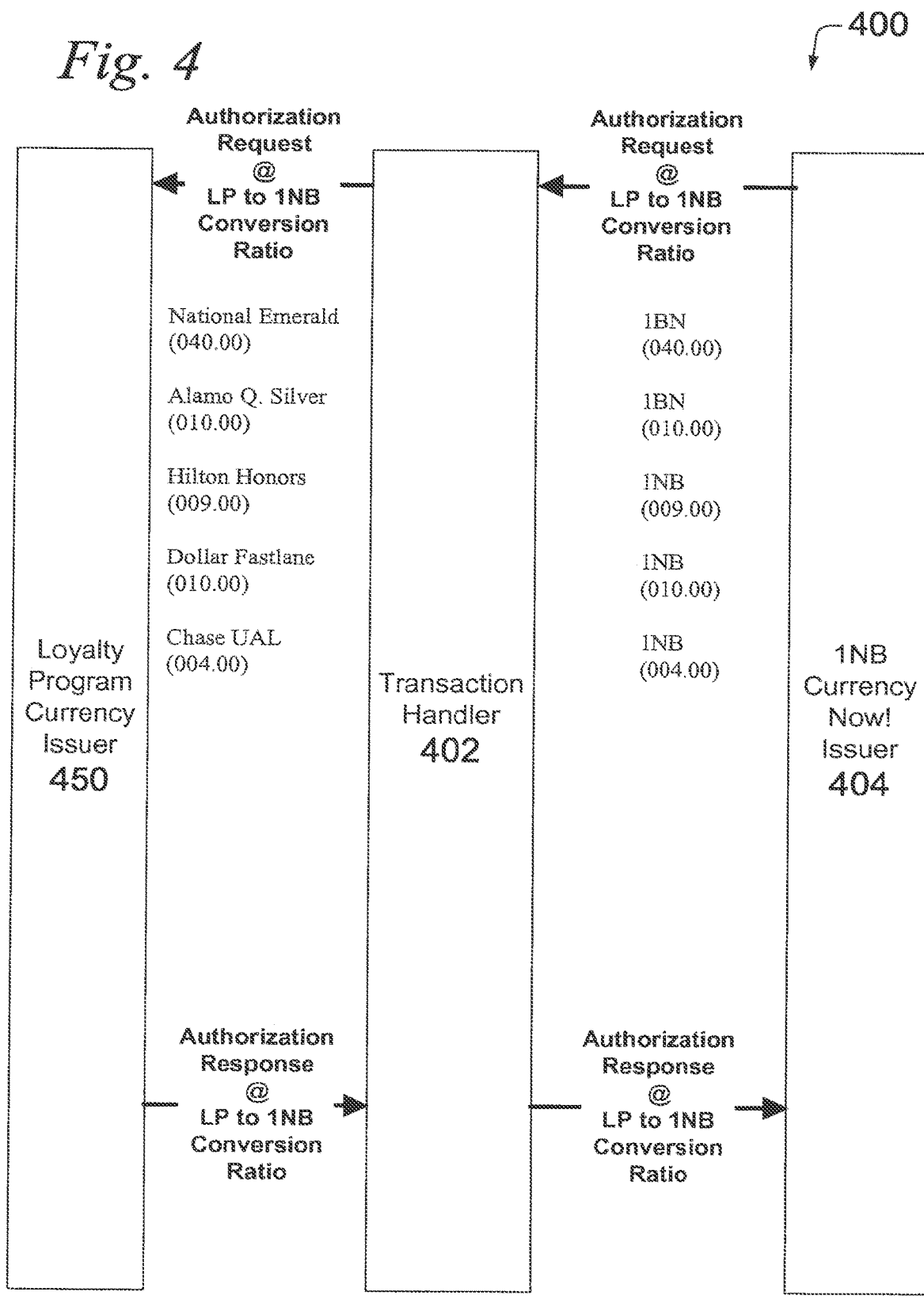
FIGS. 4, 5, 7A, 7B, and 9-12 are flowcharts of exemplary methods that can be conducted in the payment processing network of FIG. 13.
Figure 11:
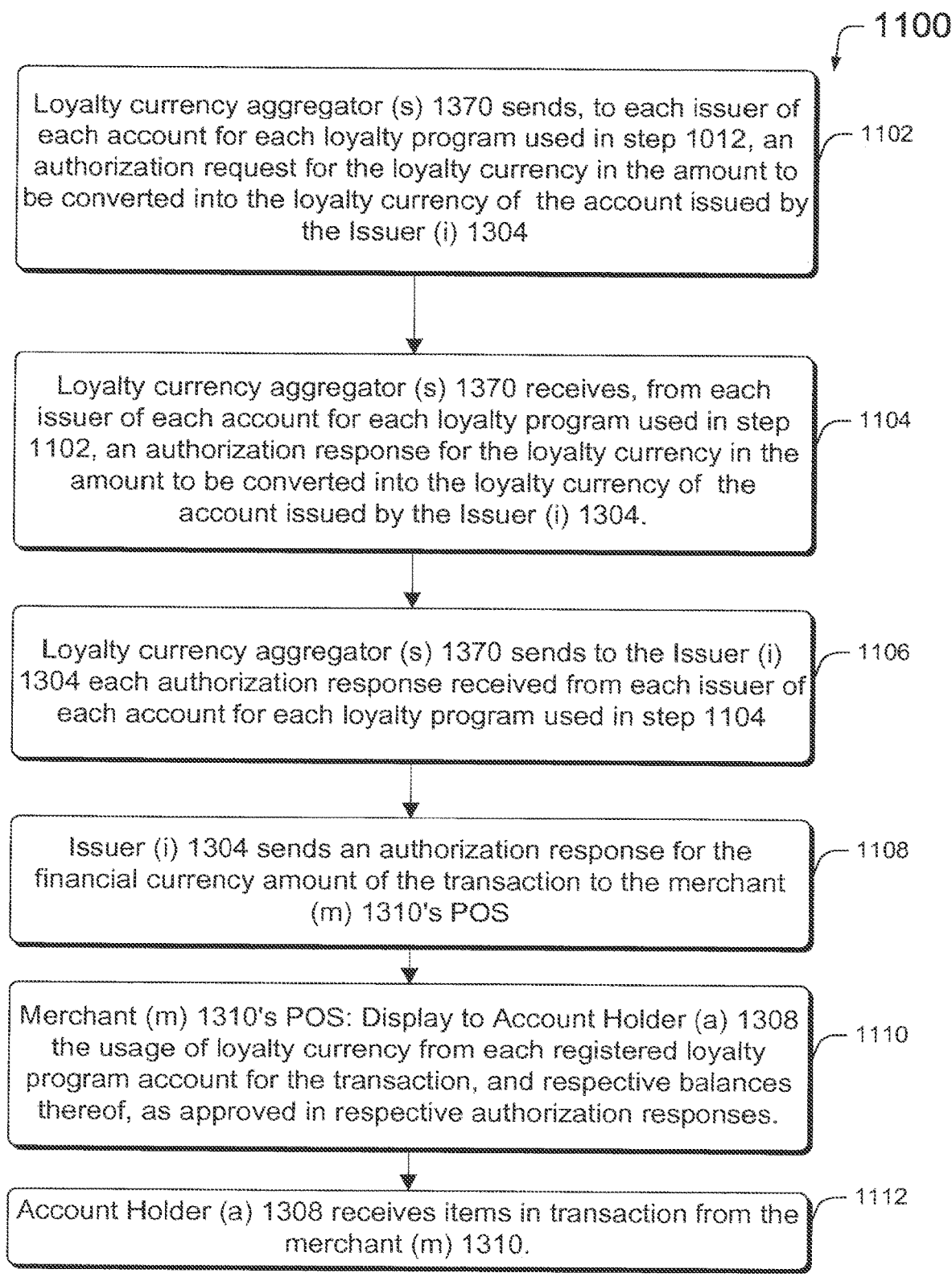

Taking FIGS. 4 and 11 together, a series of steps are taken by which the issuer First National Bank requests authorization to deduct respective loyalty program currency from each loyalty program as seen in display screen 300 and characterized in process 1000 of FIG. 10. Specifically, an authorization request is made by the issuer First National Bank for 40 points from the issuer of the National Emerald Loyalty Currency, 10 points from the issuer of the Alamo Quicksilver Loyalty Program Currency account, 9 points from the Hilton Honors issuer of loyalty currency, 10 points from the issuer of Dollar Fast Lane loyalty currency account and finally, from the account of the Chase United Airlines loyalty program there is a deduction that is requested for authorization of 4 points. The respective conversion ratios are seen in each authorization request, although this authorization request conversion ratio need not be present in the authorization request. However, the authorization request may include a specification of the merchant identifier 304 as seen in display screen 300, as this merchant identifier may affect the conversion ratio where the merchants, for instance, are competitors, as explained above. With each authorization request, an authorization response is sent back to First National Bank. In one embodiment, the transaction handler communicates each authorization request and each authorization response between respective issuers of loyalty currency.

FIG. 11 shows a working of the process depicted in FIG. 4 at reference numeral 400. In particular, process 1100 begins at step 1102 where a loyalty currency aggregator (s) 1370 sends, to each issuer of each account for each loyalty program used in step 1012, an authorization request for the loyalty currency in the amount to be converted into the primary loyalty currency of the primary account issued by the issuer (i) 1302. In this case, the issuer 1304 is First National Bank and the loyalty program is 1NB Currency Now! At step 1104 of process 1100, the loyalty currency aggregator (s) 1370 receives, from each issuer of each account for each loyalty program used in step 1102, an authorization response for the loyalty currency in the amount to be converted into the primary loyalty currency issued by the issuer (i) 1304. Comparing step 1104 to process 400 seen at FIG. 4, the authorization request is transmitted from issuer 404 through transaction processor 402 for delivery to the respective loyalty program issuer 450. In response, the issuer 450 sends an authorization response to the transaction handler 402. Transaction handler 402 sends the authorization response back to the issuer 404. Presumably, each authorization request will be answered in the affirmative via the authorization response. This affirmative authorization response indicates that the loyalty currency requested can be deducted from the loyalty program currency balance, which deduction shall be used in the form of financial currency to pay for a transaction as described herein below.

At step 1106 of process 1100, the loyalty currency aggregator (s) 1370 sends to each issuer (i) 1304 each authorization response received from each issuer of each account for each loyalty program used in step 1104. At step 1108 of process 1100, the issuer (i) 1304 sends an authorization response for the financial currency amount of the transaction to the merchant (m) 1310's POS.

Figure 3:
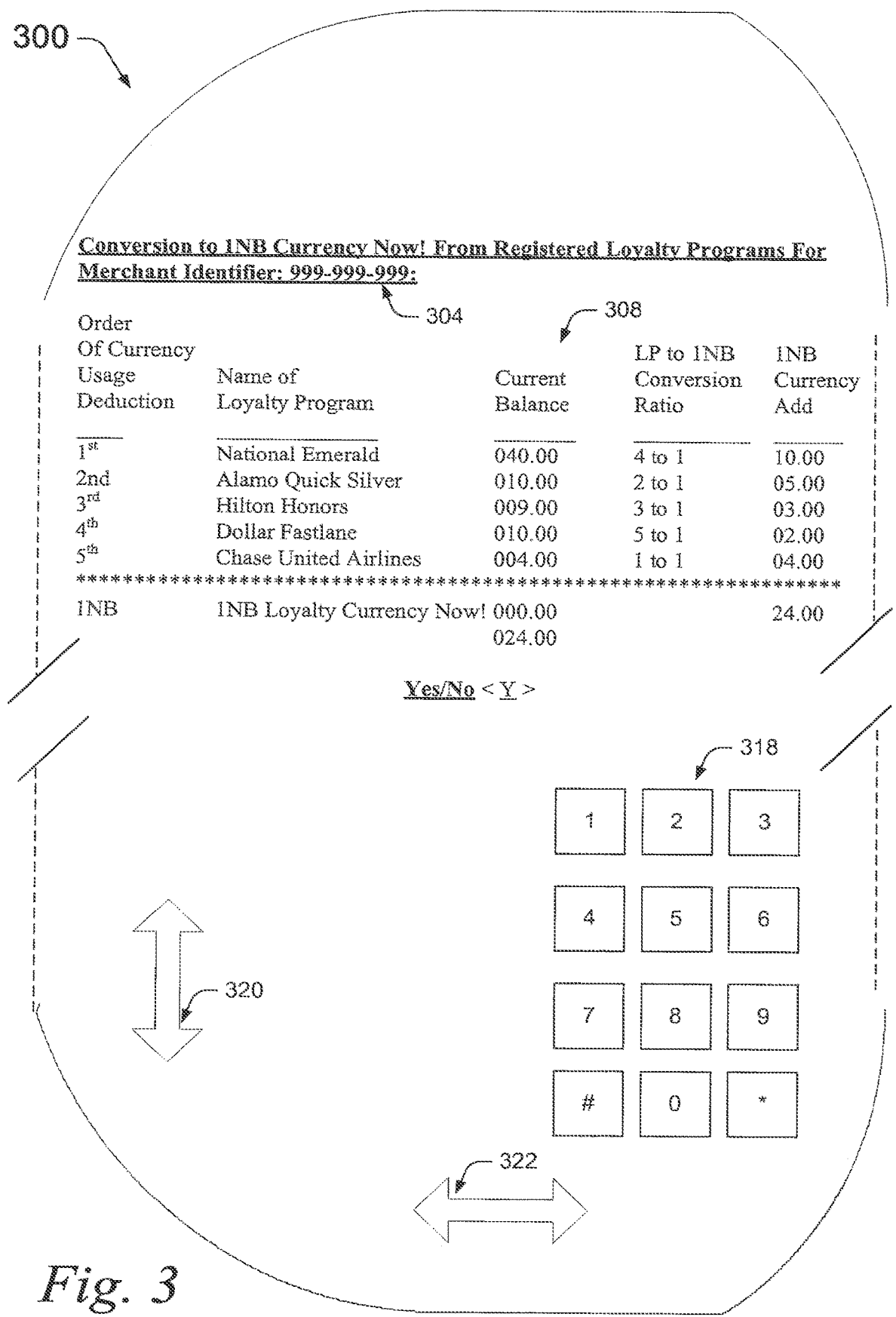

At step 1110 of process 1100, merchant (m) 1310's POS will display to the Account Holder (a) 1308 the usage of loyalty currency from each registered loyalty program account for the transaction, and the respective balances thereof, as approved in respective authorization responses as described above. By way of example and not by way of limitation, this display may be seen as depicted in FIG. 3 at display screen 300 in one embodiment thereof. Of course, other embodiments of display seen at the POS which is shown to the Account Holder (a) 1308, may be different as determined by appropriate predetermined criteria. At step 1112 of process 1100, as shown in FIG. 11, the Account Holder (a) 1308 receives the items in the transaction from the merchant (m) 1310. Thus, the transaction with respect to the Account Holder (a) 1308 is terminated though the merchant (m) 1310 still needs by paid in financial currency in the amount of the transaction via a subsequent clearing and settlement process as described hereinafter.

Figure 5:
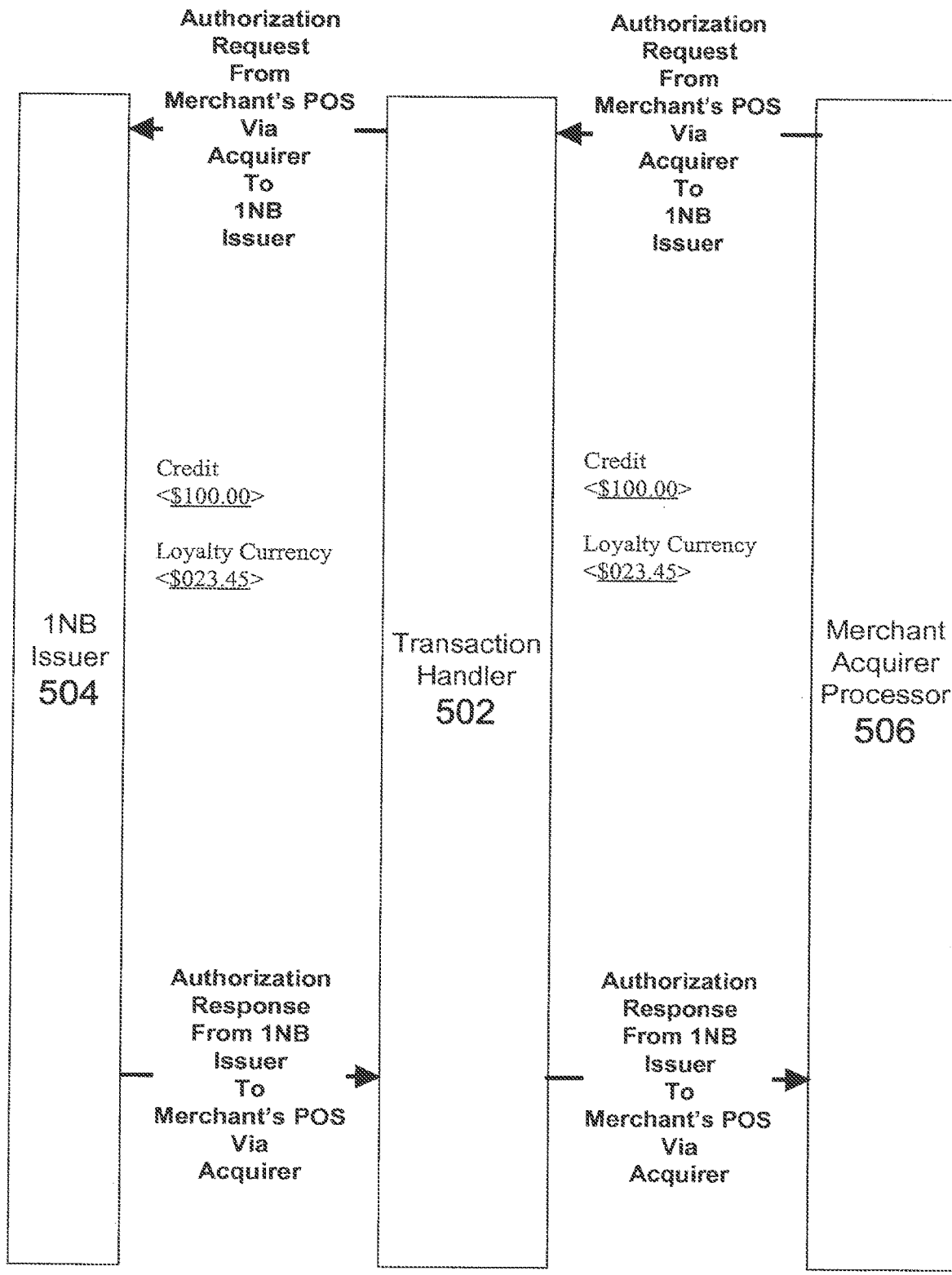
Figure 12:
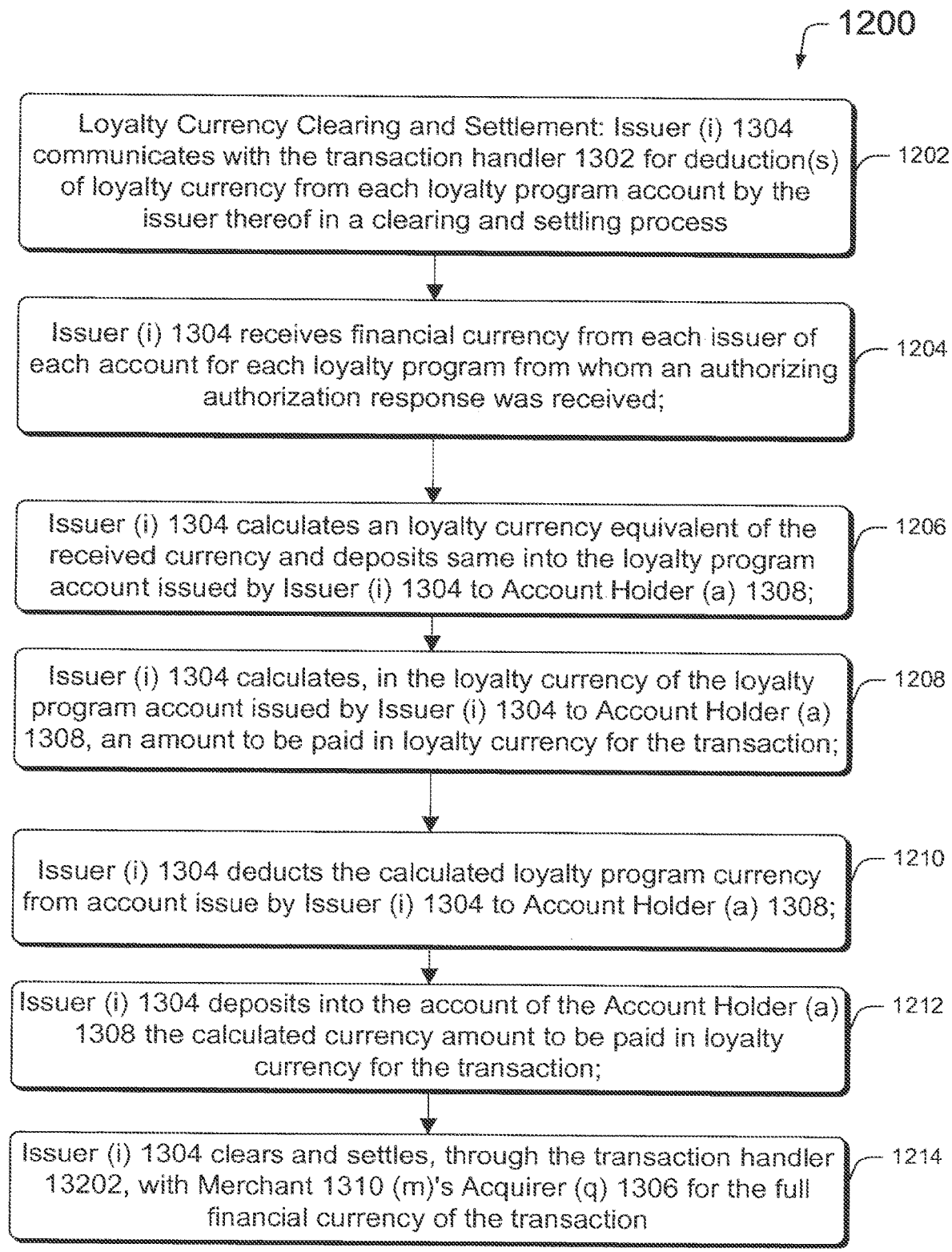

FIG. 5, taken with FIG. 12, depicts a clearing and settlement process by which a merchant is paid for a financial transaction conducted at the merchant's POS. In particular, the merchant's acquirer 506, as shown in FIG. 5, requests one or more tenders to be paid from the issuer 504. These clearing and settlement communications are communicated through a transaction handler transaction processor 502 in order to pay the merchant for the transaction. As seen in FIG. 5, a credit of $100 from a credit account is one of the tenders to be cleared and settled, and loyalty currency in the amount of $23.45 is another tender to be cleared and settled for payment of the merchant via the merchant's acquirer 506. As shown in FIG. 12, a process 1200 begins at step 1202 where a loyalty currency clearing and settlement process is initiated. In the initiation of this process, issuer (i) 1304 communicates with the transaction handler 1302 for one or more deductions of loyalty currency from each loyalty program account by the issuer thereof in a clearing and settlement process. In particular, the deductions are made from those loyalty program currencies accounts that were used in the financial transaction to pay for the total amount of the transaction, as described above. Step 1204 of process 1200 involves the issuer 1304 receiving financial currency from each issuer of each account for each loyalty program from whom an affirmative authorization response was received. Thus, the loyalty program currency account issuer pays financial currency back to the primary issuer 1304 in exchange for deducting loyalty currency from the issuer's loyalty program currency account. At step 1206 of process 1200, the primary issuer 1304 calculates a primary loyalty currency equivalent of the received currency and deposits the same into the primary loyalty currency account issued by the primary issuer 1304 to Account Holder 1308. Thus, the currency received from each loyalty program is converted into the primary loyalty program currency for the primary issuer 1304.

At step 1208 of process 1200, the primary issuer 1304 calculates, in the primary loyalty currency of the primary loyalty program account issued by the issuer 1304 to Account Holder 1308, an amount to be paid in the primary loyalty currency for the transaction. Thus, issuer 1304 figures out how much of the primary loyalty currency of its loyalty program is needed to pay for a financial transaction in financial currency at step 1208. At step 1210 of process 1200, the primary issuer 1304 deducts the calculated primary loyalty currency from the primary loyalty program currency account that was issued by the primary issuer 1304 to Account Holder 1308. At step 1212 of process 1200, issuer 1304 deposits into the financial currency account of the Account Holder 1308 the calculated financial currency amount that is to be paid in the primary loyalty currency for the transaction. Thus, the primary loyalty program currency is converted into the financial currency and is deposited into the financial currency account according to what amount is needed in order to pay for the financial transaction that is being cleared and settled.

At step 1214 of process 1200 as seen in FIG. 12, issuer 1304 clears and settles through the transaction handler 1302 with the merchant 1310 (IT)'s Acquirer (q) 1306 for the full financial currency amount of the transaction. By way of example, the primary loyalty currency that is cleared and settled is shown in FIG. 5 as being $23.45 which acquirer 506 deposits into the merchant's account that holds financial currency. As such, the merchant, along with a payment of $100 paid from a credit account, has been paid in full for the transaction conducted with the Account Holder.

Figure 6:
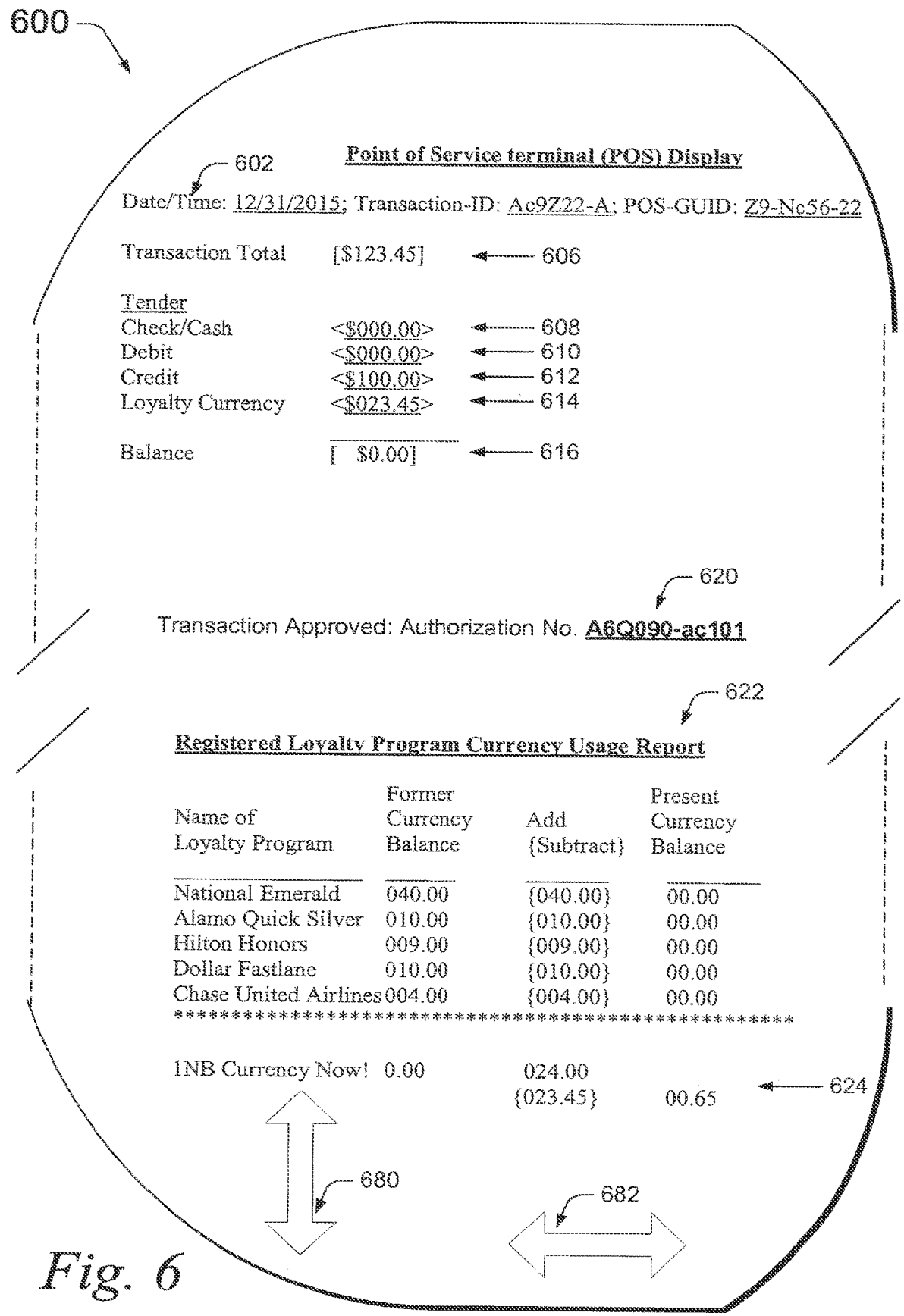

FIG. 6 depicts a display screen 600, in an exploded view thereof, which is rendered on a point of service terminal at a merchant location. As can be seen at reference numeral 620, the transaction for tendering both financial currency and loyalty currency to pay a transaction total 606, has been approved, as indicated by an authorization number seen in reference numeral 620. Respective usages of loyalty currency from respective loyalty currency accounts is seen in the table depicted at reference numeral 622. Thus, loyalty currencies respectively deducted in the designated order thereof, from loyalty programs including National Emerald, Alamo Quicksilver, Hilton Honors, Dollar Fast Lane and Chase United Airlines. The resultant balance in each respective loyalty program after the deduction is seen in table 622 and the increase in the balance of the issuer's loyalty program, 1NB Currency Now!, is also shown as being a total to 24 points. Also shown is a subtraction of 23.45 points to leave a balance of 00.65 points as shown at reference numeral 624. Display screen 600 also features a vertical navigation icon 680 and a horizontal navigation icon 682. Display screen 600 may optionally feature a virtual keypad, such as is seen in FIGS. 1, 2 and 3.

Figure 7A:
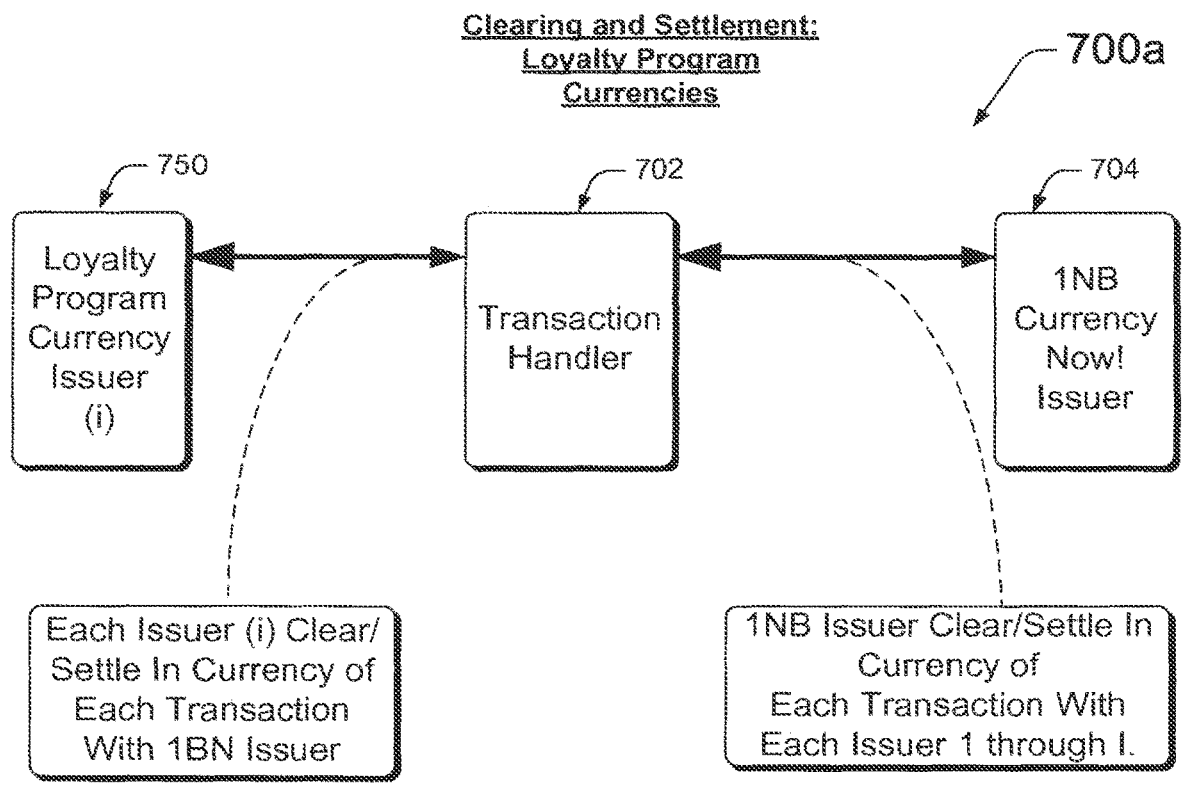

In conjunction with FIGS. 5 and 12, FIGS. 7A-7B depict, at reference numerals 700a and 700b, respectively, clearing and settlement of loyalty program currencies and financial currencies incident to conducting a transaction between a merchant and an Account Holder (a) 1308. As seen in FIG. 7A, transaction handler 702 coordinates the communication with the primary issuer (e.g.; First National Bank) at reference numeral 704 and the respective issuer of loyalty currencies, at reference numeral 750. Note that these communications with transaction handler 702 involve the First National Bank clearing and settling currency with each loyalty program currency issuer (i), where "i" can be an integer anywhere between 1 and 9 to 10 digits. Additionally, the communication between transaction handler 702 and loyalty program issuer (i) 750 involves clearing and settling each currency of each transaction with the First National Bank loyalty program how is the primary issuer. Thus, FIG. 7A shows at reference numeral 700*a* the clearing and settlement of loyalty currencies needed to conduct a financial transaction for each of the loyalty program issuers.

Figure 7B:
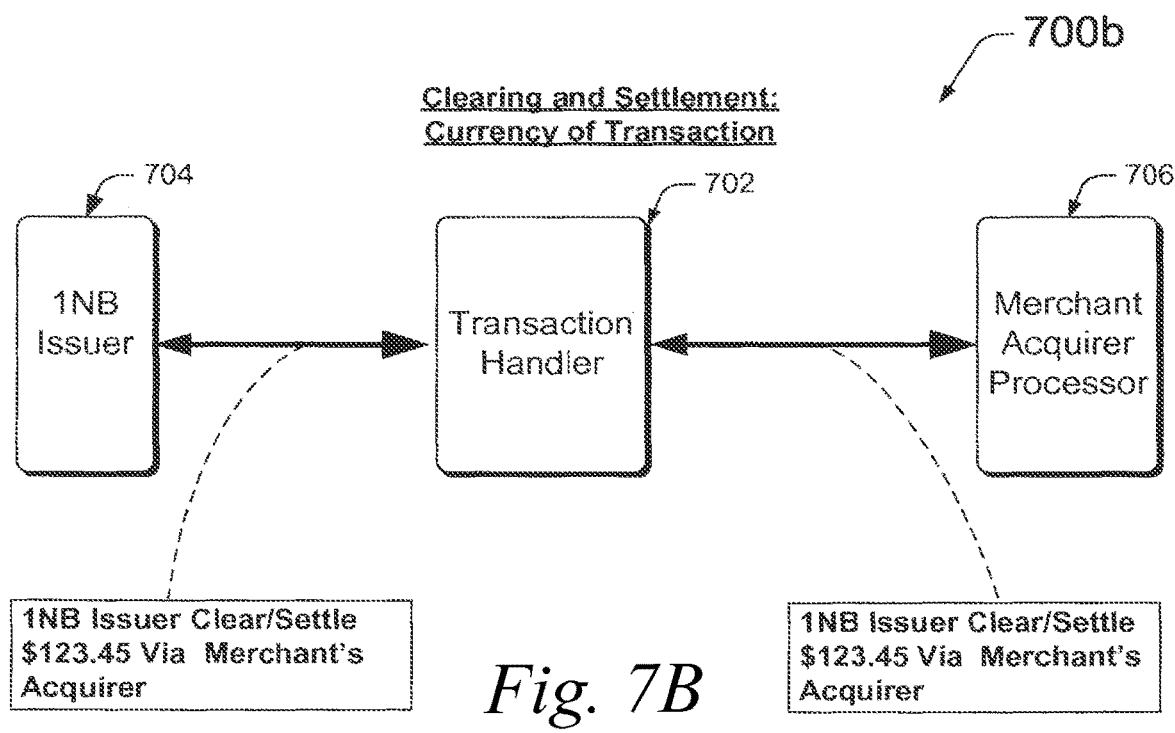

FIG. 7B depicts at reference numeral 700*b* communications between transaction handler 702 and the merchant's acquirer 706 as well as communications between transaction handler 702 and the primary issuer 704. In particular, this clearing and settlement is a total clearance of the total financial amount of the transaction, which as detailed in FIGS. 2, 3, 4, 5, and 6 is the total $123.45. The clearing and settlement process of financial transaction seen in FIG. 7B is for transactions between merchants and consumers where the transaction handler 702 coordinates communications between the merchant's acquirer and the consumer's issuer to collect funds on deposit or via a credit account, a gift account or otherwise. Note that transaction handler transaction processor 702 corresponds to transaction handler 1302 seen in FIG. 13, where the acquirer 706 corresponds to acquirer 1306, and the issuer 704 corresponds to issuer 1304 seen in FIG. 13. Additionally, loyalty program currency issuer (i) 750 corresponds to one or more issuers 1304 seen in FIG. 13.

FIG. 13 depicts a block level diagram whereby various entities are involved in authorizing transactions and clearing and settling transactions involving payments in both financial currencies and loyalty currencies. A loyalty aggregator (s) 1370 is seen "on the cloud" whereby communications can be facilitated between various entities seen in FIG. 13. One or more data bases (v) 1386 can include one or more the above described conversion ratios to be applied between one or more merchants for respective loyalty programs conducted by each. Thus, a loyalty program currency can be preferred for some merchants and disfavored for other merchants, when there is a competitive situation, so that merchant the give loyalty currencies are not compelled to give away their loyalty programs currencies to increase revenues of their competitors. Note also that one or more data bases (v) 1386 can include product level data corresponding to one or more conversion ratios to be applied for specific items purchased using loyalty currency tenders. One or more data bases (v) 1386 can also contain data for the application of ratios for specific items purchased from specific merchants using loyalty currency tenders, as well as combinations of the foregoing.

Figure 8:
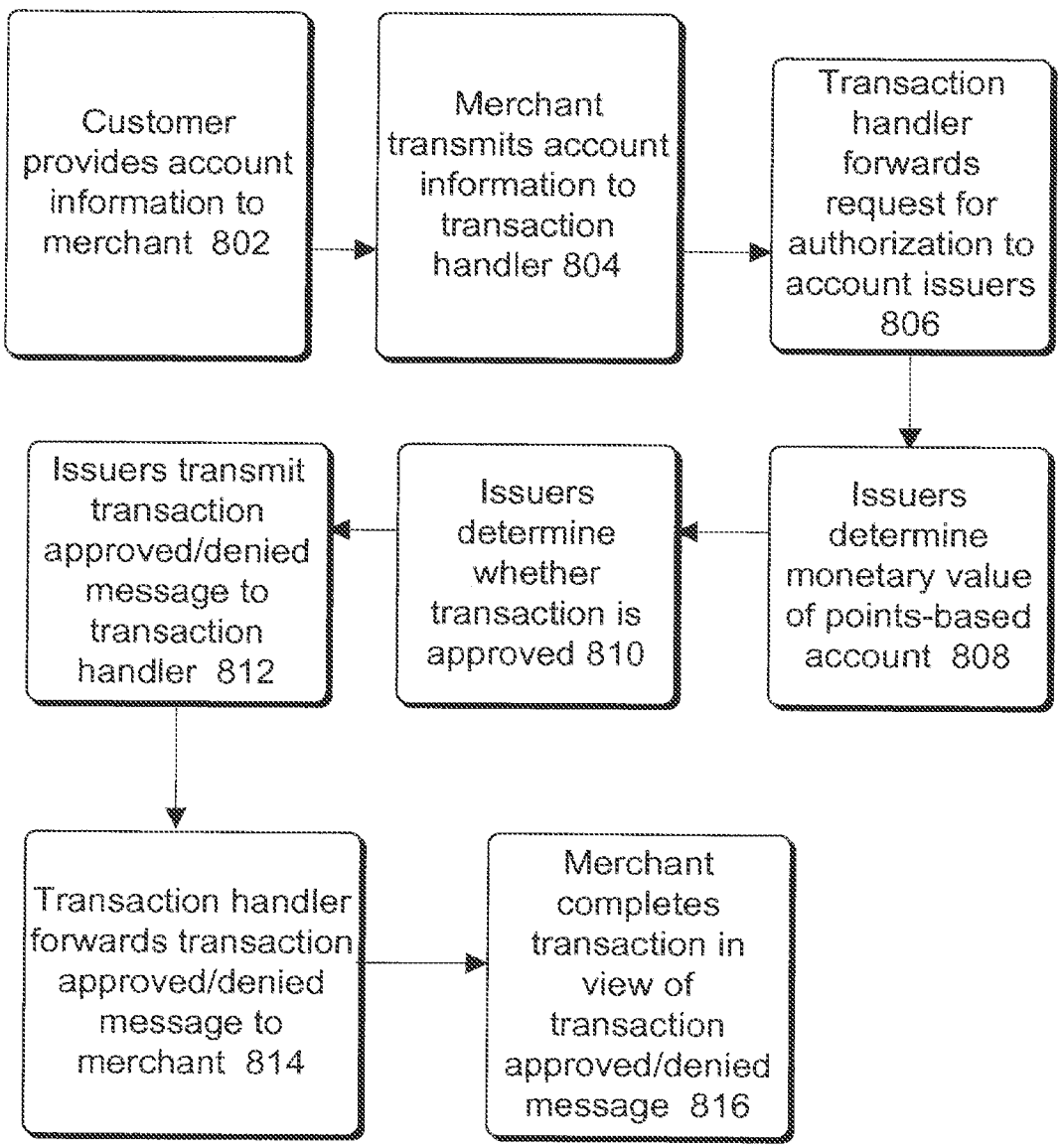
FIG. 8 illustrates an exemplary method for a consumer to conduct a transaction for the sale of goods or services from a merchant, wherein the transaction is conducted upon one or more non-monetary loyalty currency based accounts issued by respective issuers to the consumer.

In yet another implementation, referring to FIGS. 8 and 13, an account user or customer 1308 purchases goods or services using non-monetary points-based accounts such as those issued by loyalty or rewards programs, monetary accounts such as credit, debit or prepaid accounts, or a combination thereof. The transaction is executed with a merchant 1310. To perform the transaction, merchant 1310 transmits customer 1308's account information or other customer identification information to transaction handler 1302 (in some cases, via acquirer 1306). Transaction handler 1302 communicates with the issuers 1304 of customer 1302's accounts to determine whether there are sufficient funds or points available to execute the transaction. After receiving a response from issuer 1304, transaction handler 1302 informs merchant 1310 whether the transaction is approved or denied.

A transaction begins with a customer 1308 communicating an account number or other identification information to merchant 1310 through the use of a computer terminal, portable consumer payment device (e.g.; a credit, debit, gift, or prepaid card) or other device encoding such account information. The identification information is used by merchant 1310 to initiate a transaction for goods or services and identifies one or more accounts held by customer 1308. In some implementations, customer 1308 provides the account information to merchant 1310 using other methods or mechanisms such as by verbally instructing a teller operating a point of sale terminal (POS) at the point of interaction, verbally interacting with an electronic or computer-based point of sale system configured with a voice or speech recognition system (i.e.; VOR), entering the identification information into a POS using a mechanical keypad, or any other method of communicating the identification information to merchant 1310. Customer 1308 may be an individual or a corporate entity. Customer 1308 may be an account holder of an account issued by issuer 1304 such as a joint account holder of the account or a person having access to the account such as an employee of a corporate entity having access to a corporate account. The portable consumer payment device may include a payment card, a gift card, a smartcard, a smart media device, a payroll card, a health care card, a wrist band, a machine readable medium containing account information, a keychain device such as the SPEED-PASS® commercially available from ExxonMobil Corporation or a supermarket discount card, a cellular phone, personal digital assistant, a pager, a security card, a computer, an access card, a wireless terminal, or a transponder. The portable consumer device may include a volatile or non-volatile memory (including electrical and/or magnetic systems) to store information such as the account number or an account holder's name.

Merchant 1310 uses an acceptance point device, such as a POS terminal, Internet website, mail-order system, telephone order system or other customer interface system, to obtain account information, such as an account number or other customer 1308 identification information, from the portable consumer device or directly from customer 1308. When the identification information is stored on the portable consumer device, the portable consumer device may interface directly with the POS or other customer interface system using a mechanism including any suitable electrical, magnetic, or optical interfacing system such as a contactless system using radio frequency, a magnetic field recognition system, or a contact system such as a magnetic stripe reader.

In a first example transaction as illustrated in FIG. 8, the customer 1308 holds an account with a rewards or loyalty program made available by an issuer. As part of the program, customer 1308's account stores a number of points, credits, cellular telephone air time minutes, miles or other non-monetary tokens (to simplify terminology, all non-monetary or non-financial measurement units including but not limited to tokens, miles, minutes, and credits may be referred to collectively as "points") associated with customer 1308. As customer 1308 participates in the program, customer 1308 accumulates points within the account. After accumulating the points, the points may later be redeemed for discounts on certain goods or services or to provide alternative benefits to customer 1308 such as expedited processing, preferred status, upgrades or free gifts, for example. Points are earned by undertaking various activities defined by the terms of customer 1308's account and the loyalty program, including the purchase of certain products, regular use of a particular service offered by the account issuer, or the making of referrals to the issuer, for example. Depending upon the loyalty program, any algorithm or metric may be used to assign points to the account belonging to a particular customer 1308 depending upon any of the actions of the customer 1308 or other factors determined to be relevant to the allocation of points to the customer 1308 such as bonus days, weeks or time periods, bonus locations, or other bonus programs.

In one example program, a particular chain of hotels offers a loyalty program. A customer opens an account with the hotel and accumulates points within their loyalty program by staying at the hotel, purchasing food or services at the hotel, and making referrals for others to stay at the hotel. As part of the loyalty program, the hotel offers certain discounts, products or services that will be exchanged for the points held by customer 1308. To perform a transaction using the points, customer 1308 exchanges a certain number of points from customer 1308's account for the goods or services. Depending upon the program, the points may also be redeemable to purchase non-hotel related products.

Depending upon the operation of customer 1308's account, customer 1308 may receive a membership card that identifies the account number of customer 1308 within the loyalty program by printing an account number on a face of the card. In other systems, the account information is encoded within a magnetic bar strip of a credit or debit card. Alternatively, other portable consumer devices, as described above, may be used to encode and store the account information and be carried by customer 1308.

To enter into a transaction for goods or services using the present system, customer 1308 first selects various goods or services to be purchased from a merchant 1310. A total transaction amount is determined for the goods or services and customer 1308 provides the account information to merchant 1310 to pay for the transaction using the points stored in customer 1308's account in step 802 (as shown on FIG. 8). The account information provided to merchant 1310 identifies customer 1308's account containing customer 1308's points. In the present example, merchant 1310 collects the account information from customer 1308 using a POS or other customer interaction device which communicates with customer 1308's portable consumer device to retrieve the account information. In one implementation, the POS reads a magnetic strip on an account card carried by customer 1308. In other systems, however, the account information is communicated to merchant 1310 verbally, or through another input mechanism (such as a mechanical keypad, cellular telephony interface or voice recognition system). In some cases, customer 1308's phone number, rewards card number, or other information may be used to identify customer 1308's account.

Having retrieved the account information (and, optionally, any other transaction-related data) from customer 1308, merchant 1310 initiates a payment transaction process to complete the exchange of goods and services. In step 804, merchant 1310 transmits the transaction information to transaction handler 1302 (in some cases the information is routed through acquirer 1306) in a request for authorization. The transaction information may include a listing of goods or services to be purchased, a total transaction amount, customer 1308's account history, information describing merchant 1310, a preferred method of paying for the transaction, an identity of issuer 1304 of the loyalty program, the account information, and any other information describing the transaction, the parties involved, or the goods or services being exchanged. The request for authorization is transmitted to transaction handler 1302 using Internet 1312, dedicated communication systems 1368-1376, or another communication medium.

Transaction handler 1302 receives the request for authorization sent from merchant 1310 and uses the transaction information associated with the request for authorization to identify and communicate with issuer 1304 to perform transaction processing. Depending upon the system implementation, customer 1308's account information may be included within the request for authorization, or in a separate transmission communicated at a different time, and may directly encode the identity and contact information of the account's issuer 1304, such as by including routing information or a bank identification number (BIN) in the transaction information. In other embodiments, however, transaction handler 1302 performs a look-up on a database of issuers 1304 to identify those issuers 1304 that are responsible for each such customer 1308's account. For example, if the transaction request includes a user identification code to identify customer 1308, transaction handler 1302 searches through the database to find issuers 1304 with programs of which customer 1308 is a member.

After retrieving the contact information for issuer 1304 of customer 1308's account, transaction handler 1302 transmits the request for authorization and associated transaction information to issuer 1304 via Internet 1312 or other communication medium such as via dedicated communication system 1368-1376 in step 806. In some cases, transaction handler 1302 supplements the transaction information included within the request for authorization with additional data describing customer 1308's other loyalty program memberships, customer 1308's other transactions for similar goods, customer 1308's interaction with other similar merchants 1310, or any other information describing customer 1308's previous transaction history, for example.

In the event that issuer 1304 cannot be contacted or is unable to process the request for authorization (for example, if Internet 1312 or dedicated communication systems 1368-1376 are unavailable or inactive, or issuer 1304 is otherwise unresponsive), transaction handler 1302 may use a stand-in processing (STIP) algorithm to provide temporary authorization for the transaction. To determine whether STIP is available, transaction handler 1302 reviews the details of the request for authorization received from merchant 1310 in addition to other transaction details to determine whether the transaction meets certain STIP requirements. For example, if the total value of the transaction is under a defined dollar amount or involves a certain category of goods or services, and customer 1308 is a member of particular pre-determined loyalty programs or has certain non-monetary points-based accounts, the transaction may be authorized by STIP. If the transaction does not meet the requirements for STIP and is not authorized, transaction handler 1302 informs merchant 1310 that the transaction is denied, and merchant 1310 takes appropriate action. If the transaction is approved by STIP, merchant 1310 is informed that the transaction is approved and merchant 1310 acts accordingly. In transactions approved by STIP, a later-occurring clearance and settlement process is used to ensure that the necessary funds are exchanged between issuer 1304 and acquirer 1306 to compensate acquirer 1306 for the total value of the transaction.

After receiving the request for authorization and transaction information from transaction handler 1302, issuer 1304 of customer 1308's account retrieves customer 1308's account information to determine whether to approve the transaction. The account information may include the number of points in customer 1308's account, transaction history information for customer 1308, and customer 1308's account status, membership level, or any other information describing the relationship between customer 1308 and issuer 1304 accessible to issuer 1304.

Issuer 1304 reviews the request for authorization, transaction information and customer 1308's account information to determine a monetary value for the points stored in customer 1308's account in step 808. In one system implementation, issuer 1304 converts or translates the number of points in customer 1308's account into a monetary value using a linear multiplier algorithm (e.g., 1 point=$1). Other algorithms may include assigning multiple monetary values at different numbers of total points. For example, in one algorithm, the first 1,000 points in customer 1308's account are valued at $1 per point, the second 1,000 points are valued at $1.05 per point, the third 1,000 points are valued at $1.10 per point, etc. Alternatively, the multiplier may scale geometrically or exponentially with the number of points. In one algorithm, a points multiplier is determined by the total number of points stored in the account. After determining an equivalent monetary value for customer 1308's account, the monetary value is compared to the total amount of the transaction as described in the request for authorization in step 810. If there are sufficient points having a sufficient monetary value in customer 1308's account to satisfy the transaction, the transaction will be approved. Alternatively, if there are insufficient funds, the transaction will be denied.

In some cases, issuer 1304 applies more complex business rules to determine the monetary value of points stored in customer 1308's account and whether to approve or deny a particular transaction. For example, if customer 1308 has a certain membership status with issuer 1304, the multiplier value may be adjusted (e.g., if customer 1308 has a "gold" membership, the points calculation is 1 point=$1.5 rather than $1 as is the case in normal memberships). Other factors that may affect the exchange rate for points include, for example, the total number of points held by customer 1308, account status, transaction history, membership status/level, the identity of the employer of customer 1308, other benefits applied to customer 1308's account, the store location where the transaction takes place, or the merchant 1310 executing the transaction. In determining an appropriate monetary value for the points in customer 1308's account, issuer 1304 may use any account information associated with customer 1308, any information transmitted with the request for authorization including all transaction information, and any other information accessible to issuer 1304. Accordingly, the determination of a monetary value for the points held in customer 1308's account may be based upon any combination of factors provided by any sources in communication with issuer 1304.

In some circumstances, transactions for customer 1308s having no points in a particular program will be approved. For example, if customer 1308 meets a particular membership level requirement, or has a transaction history including certain characteristics such as a particular transaction volume or average amount of transactions, for example, the transaction may be approved on those factors alone, with no minimum points requirements being met or even required. For example, a customer 1308 may wish to purchase $10 worth of food from a fast-food restaurant using points in customer 1308's account associated with a hotel-based loyalty program. Even if customer 1308 has acquired no points in the account, if the customer 1308 has a "gold" membership within the hotel's loyalty program, the hotel may authorize the purchase. In this example, customer 1308 swipes a loyalty program membership card at a POS within the fast-food restaurant and the hotel acts as the issuer of customer 1308's account. As the issuer, the hotel verifies customer 1308's membership level before authorizing the purchase. Additional factors that may be used to authorize the purchase include the low cost of the transaction, and the business relationship between the hotel and the fast-food restaurant. The same purchase at another hotel chain or restaurant, or for a larger amount, may not be approved based solely on customer 1308's "gold" membership, for example, and may require a certain number of points in customer 1308's account.

In some cases, issuer 1304 interacts with one or more "points brokers" (e.g.; loyalty aggregator (s) 1370 in FIG. 13) to gather additional information before determining a monetary value for the points in one or more of the customer 1308's account that are to be used as financial currency in a transaction. Issuer 1304 interacts with each points broker via Internet 1312, or other dedicated or public communication system, to determine a monetary value for each of the points in each of the customer 1308's accounts. In one example, the points broker is a third-party organization that accumulates data from many different loyalty points programs and independently determines a real-world monetary value for the points. In determining whether to approve a particular transaction, issuer 1304 may communicate with the points broker to gather additional data for determining an exchange rate between points and their real-world monetary value. As part of the service, a payment may be made to the broker service in exchange for the information. In other implementations, the transaction takes place through the broker, with the transaction handler 1302 communicating with the points broker directly to determine whether a transaction is approved and the points broker facilitating the communication between issuer 1304 and transaction handler 1302.

After approving a transaction, issuer 1304, if applicable, deducts the appropriate number of points from each of the customer 1308's accounts being used and transmits for each a respective transaction authorization response to transaction handler 1302 in step 812. If the transaction is approved, issuer 1304 notifies transaction handler 1302 that the transaction is approved. Alternatively, if the transaction is denied, issuer 1304 notifies transaction handler 1302 that the transaction is denied.

In processing the transaction, issuer 1304 may transmit additional information back to transaction handler 1302 in response to the transaction request. Additional data may include the current balance of customer 1308's account in both number of points and/or a monetary value (for example, in response to a balance inquiry submitted via merchant 1310). In some cases, in addition to an approval or denial of the transaction, issuer 1304 sends special instructions to transaction handler 1302 in response to the transaction request. The additional data may include instructions to provide bonuses or other special treatment to customer 1308 such as access to a special check-in line, special check-out line, a waiver of the requirement that customer 1308 have a ticket for a particular event, a free or complimentary purchase or service, or instructions to provide customer 1308 with a free gift. In other implementations, the additional data may include any information or intelligence relating to the goods or services involved in the transaction, customer 1308, or merchant 1310 that are accessible to issuer 1304.

After receiving the transaction authorization or denial and any other data transmitted by issuer 1304 in response to the request for authorization to transaction handler 1302, transaction handler 1302 forwards the information to merchant 1310 in step 814.

In some implementations of the present system, the information forwarded to merchant 1310 takes the form of conventional transaction approval or denial messages used for other credit card/debit card transactions or transactions associated with other payment instruments and payment processing networks. In other implementations of the system, however, the information forwarded to merchant 1310 includes both the approval or denial message encoded in a proprietary manner, an account balance, and/or any other information provided by issuer 1304 such as a description of special instructions for customer service.

Merchant 1310 receives the transaction authorization or denial from transaction handler 1302 and processes the transaction accordingly in step 816. Merchant 1310 may also retrieve any additional information (including any special instructions) included with the transaction authorization or denial received from transaction handler 1302. In accordance with the special instructions or other information, merchant 1310 may provide additional services or provide additional goods to customer 1308, or otherwise modify customer 1308's experience. For example, and as further described above, merchant 1310 may provide customer 1308 a special check-in or check-out line, provide additional services to customer 1308, give customer 1308 a free gift, allow early check-in, provide automatic upgrades, etc.

In another example transaction, customer 1308 wishes to enter into a transaction for the sale of goods or services using a combination of accounts against which the transaction will be executed. The accounts may include monetary accounts such as credit, debit, or prepaid accounts, or non-monetary accounts such as those holding points, miles, tokens, or other non-monetary credits made available via a loyalty, valued-customer program, or other program or membership program generating non-monetary credits exchangeable for goods, services, upgrades or other items of value.

In the present example, the account information for the multiple accounts may be stored on a single card or personal consumer device, or multiple cards or personal consumer devices. For example, customer 1308 may carry a generic rewards card upon which customer 1308, issuer 1304, transaction handler 1302, acquirer 1306, or merchant 1310 loads information describing a plurality of non-monetary points-based account numbers. In one example, the account numbers for both monetary and non-monetary points-based accounts are stored on the same card or personal consumer device, each being encoded within the card's magnetic strip, EEPROM, or other data storage and retrieval mechanism. In other implementations, however, customer 1308 is provided with a single card or personal consumer device which stores a single identifier that identifies customer 1308 and stores no account information. In that case, customer 1308's account and issuer 1304 information may be retrieved from a database residing on one or more of issuer 1304, transaction handler 1302, acquirer 1306, merchant 1310, and any affiliated points brokers. The database identifies the monetary accounts and the non-monetary points-based accounts that are affiliated with the customer identification data belonging to customer 1308.

For example, a customer 1308 may have a credit account through issuer A with account number 1111-1111-1111-1111, a debit account through issuer B with the account number 2222-2222-2222-2222, and a loyalty points account through a hotel chain (issuer C) with the account number 3333-3333-3333-3333. In one system implementation, customer 1308 carries a card with a user identification number of #123456 embodied therein. The card does not include any account information for the credit, debit or non-monetary points-based account and does not identify issuers A, B and C. In that case, as part of the transaction and after receiving the customer 1308 identification number, transaction handler 1302 accesses a database that identifies which accounts are held by which customer 1308s as identified by their customer 1308 identification number. Accordingly, when making a purchase, customer 1308 provides his or her customer 1308 identification number to merchant 1310, for example by swiping a card at a POS operated by merchant 1310. Merchant 1310 retrieves the customer 1308's identification number, but has no knowledge of which account numbers or which issuers are associated with the customer 1308 identification number. To process the transaction, merchant 1310 forwards the customer 1308 identification number to transaction handler 1302 as part of the request for transaction approval. Transaction handler 1302 receives the request for transaction approval and retrieves the customer 1308 identification number from the request for authorization. In order to process the request, transaction handler 1302 must know which accounts are associated with customer 1308 in order to submit the request to their associated issuers 1304 for processing. Accordingly, transaction handler 1302 uses the database to search for all accounts associated with customer 1308 having customer identification number #123456. After retrieving the accounts and identifying the account issuers 1304, transaction handler 1302 forwards the request for authorization and related transaction data to the relevant issuers 1304 for authorization.

In the present example, the transaction information included within the request for approval transmitted from merchant 1310 to transaction handler 1302 may include one or more indications of a preferred payment method. For example, when wishing to execute a transaction against multiple accounts, customer 1308 may indicate at the POS, or other customer interaction device, which of the available accounts to use, how much of the transaction should be applied to each account (specified using either a monetary value, or a number of points), to which account the balance of the transaction should be applied if the other accounts do not include sufficient funds or points to cover the transaction, and a preferred account for receiving any rebates, discounts, or charge-backs. Before making these allocations, customer 1308 may use the POS or another customer interaction device provided by merchant 1310 to check the balance of each account associated with customer 1308.

In the event that transaction handler 1302 includes a database containing customer 1308 identification numbers and identifying their associated account numbers, transaction handler 1302 provides a user interface that allows customer 1308s to log-in and specify to which accounts their customer 1308 identification number should be linked. For example, if a customer 1308 signs up for a new loyalty program and is issued account number 5555-5555-5555-5555, that customer 1308 may log-in to transaction handler 1302 to update the database records and specify that the account number 5555-5555-5555-5555 should be associated with their customer 1308 identification number. The user interface may be provided via a website, cell-phone interface, customer service representative or other system for capturing data from customer 1308. Alternatively, issuer 1304 associated with the new account may transmit the new account information with customer 1308's identification number to transaction handler 1302 for entry into the database.

In some cases, multiple non-monetary (non-financial currency) rewards accounts may be associated with a single credit, debit, prepaid, or other monetary account. For example, instead of issuing customer 1308 a customer identification number, a plurality of accounts (including non-monetary points-based accounts) are associated with a single credit, debit, prepaid, or other monetary account. In that case, customer 1308 provides merchant 1310 with the monetary account number, which is sent to transaction handler 1302 for processing. The transaction handler 1302 uses the monetary account number to search the database and retrieve any non-monetary accounts associated with the monetary account number. The transaction may then be applied against a combination of monetary and non-monetary points based accounts associated with customer 1308.

When undertaking a transaction against multiple accounts (including a combination of monetary and non-monetary points-based accounts), customer 1308 may elect to enter into a split tender sale. A split tender sale involves a transaction where customer 1308 may pay for part of a transaction with points, and part with another form of payment such as a credit, debit or prepaid account. For example, customer 1308 may wish to purchase an item for $100 using two accounts, one a conventional credit card account and the other a non-monetary points-based account. At the POS provided by merchant 1310, customer 1308 can check the monetary value or balance of the points available in customer 1308's non-monetary points-based account. If the monetary value of the non-monetary points-based account is insufficient, the customer 1308 may instruct the merchant 1310 via the POS to pay for the $100 using all available points, and applying the balance of the transaction to the credit card account. During operation of the present system, the customer 1308 can elect to the cancel the transaction, or select an alternative payment method at any time prior to the merchant 1310 transmitting the request for authorization and related transaction information to the transaction handler 1302.

In this system, the merchant's point of interaction with the customer becomes a possible redemption channel for non-monetary credit. Accordingly, customer 1308 or cardholder is able to redeem points or credits for any item the merchant offers provided that the points available to the customer have sufficient monetary value to execute the transaction. This prevents the customer from being limited by the options available through conventional rewards catalog that only offer limited products, and limited opportunities to redeem points. Furthermore, turning the merchant point of customer interaction into a redemption channel for non-monetary credits may ultimately reduce administrative costs associated with a rewards program and the processes associated with rewards fulfillment by facilitating and optimizing inventory management, shipping procedures, etc.

In many of the foregoing implementations, when non-monetary currency is on deposit in an account 1308 issued to an account holder (a) 1308 by an issuer 1304 (i) or agent issuer (ai) 1304 thereof, the non-monetary currency in one or more such accounts 1308 is used in a transaction to pay for goods and services purchased by an account user (au) 1308 of a corresponding account 1308 from a merchant (m) 1310. For each such transaction and for each account 1308 that was used in the transaction, the merchant (m) 1310 sends information about (i) the respective accounts 1308; (ii) the transaction; and (iii) the non-monetary currency used from the respective account 1308 in order to conduct the transaction. This information is sent to one or more corresponding acquirers (q) 1306, or agent acquirers (aq) 1306 thereof, for that merchant (m) 1310. Each acquirer (q) 1306, or agent acquirer (aq) 1306 thereof, sends information about the account(s) 1308 to the transaction handler 1302 who in turn distributes the information about the account 1308 that had been used in the transaction to the respective issuer (i) 1304, or agent issuer (ai) 1304 thereof, for each account 1308. These issuers 1304 send money, or equivalents thereof, back to the transaction handler 1302 who in turn distributes the money to the one or more acquirers (q) 1306 or agent acquirers (aq) 1306 thereof, who in turn deposit money, or equivalents thereof, into one or more accounts issued to the merchant (m) 1310 by respective acquirers (q) 1306 or agent acquirers (aq) 1306 thereof. The money, or equivalents thereof, so deposited for the benefit of the merchant (m) 1310 in effect reimburses or otherwise makes the merchant (m) 1310 whole for accepting non-monetary currency in exchange for the goods and services traded in the transaction with the account user (au) 1308.

Payment Processing Network.

FIG. 13 illustrates an exemplary open system payment processing network 1300, depicting a general environment in which a merchant (m) 1310 can conduct a transaction for goods and/or services with an account user (au) or customer on an account (e.g., a prepaid account, credit account, points account, etc.) issued to an account holder (a) 1308 by an issuer (i) 1304, where the processes of paying and being paid for the transaction are coordinated by a transaction handler 1302. The transaction includes participation from different entities that are each a component of the payment processing system 1300.

Payment processing system 1300 has a plurality of merchants 1310 that includes merchant (1) 1310 through merchant (M) 1310, where M can be up to and greater than an eight digit integer.

Payment processing system 1300 has a plurality of accounts 1308 each of which is held by a corresponding account holder (1) 1308 through account holder (A) 1308, where A can be up to and greater than a ten eight digit integer.

Payment processing system 1300 includes account user (1) 1308 through account user (AU) 1308, where AU can be as large as a ten digit integer or larger. Each account user (au) may act as a customer and initiate a transaction for goods and/or services with merchant (m) 1310 using an account that has been issued by an issuer (i) 1304 to a corresponding account holder (a) 1308. Data from the transaction on the account is collected by merchant (m) 1310 and forwarded to a corresponding acquirer (a) 1306. Acquirer (a) 1306 forwards the data to transaction handler 1302 who facilitates payment for the transaction from the account issued by the issuer (i) 1304 to account holder (a) 1308.

Payment processing system 1300 has a plurality of issuers 1304. Each issuer (i) 1304 may be assisted in processing one or more transactions by a corresponding agent issuer (ai) 1304, where 'i' can be an integer from 1 to I, where 'ai' can be an integer from 1 to AI, and where I and AI can be as large as an eight digit integer or larger.

Payment processing system 1300 has a plurality of acquirers 1306. Each acquirer (q) 1306 may be assisted in processing one or more transactions by a corresponding agent acquirer (aq) 1304, where 'q' can be an integer from 1 to Q, where 'aq' can be an integer from 1 to AQ, and where Q and AQ can be as large as a eight digit integer or larger.

Payment processing system 1300 has a transaction handler 1302 to process a plurality of transactions. The transaction handler 1302 can include one or a plurality of networks and switches 1302. Each network/switch (ns) 1302 can be a mainframe computer in a geographic location different than each other network/switch (ns) 1302, where 'ns' is an integer from one to NS, and where NS can be as large as a four-digit integer or larger.

Dedicated communication systems 1368-1376 (e.g., private communication network(s)) facilitate communication between the transaction handler 1302 and each issuer (i) 1304 and each acquirer (a) 1306. The Internet 1312, via e-mail, the World Wide Web, cellular telephony, and/or other optional public and private communications systems, can facilitate communications using communication systems 1350-1366 among and between each issuer (i) 1304, each acquirer (a) 1306, each merchant (m) 1310, each account holder (a) 1308, and the transaction handler 1302. Alternatively and optionally, one or more dedicated communication systems 1350-1366 can facilitate respective communications between each acquirer (a) 1306 and each merchant (m) 1310, each merchant (m) and each account holder (a) 1308, and each account holder (a) 1308 and each issuer (i) 1304, respectively.

Each acquirer (q) 1306 may be assisted in processing one or more transactions by a corresponding agent acquirer (aq) 1304, where 'q' can be an integer from 1 to Q, where aq can be an integer from 1 to AQ, and where Q and AQ can be as large as a eight digit integer or larger.

Merchant (m) 1310 may be a person or entity that sells goods and/or services. Merchant (m) 1310 may also be, for instance, a manufacturer, a distributor, a retailer, a load agent, a drugstore, a grocery store, a gas station, a hardware store, a supermarket, a boutique, a restaurant, or a doctor's office. In a business-to-business setting, the account holder (a) 1308 may be a second merchant making a purchase from another merchant (m) 1310. Merchant (m) 1310 may use at least one point-of-sale terminal (POS) that can communicate with acquirer (a) 1306, transaction handler 1302, or issuer (i) 1304. Thus, the POS terminal is in operative communication with the payment processing system 1300.

Typically, a transaction begins with account user (au) 1308 presenting a portable consumer device to merchant (m) 1310 to initiate an exchange for a good or service. The portable consumer device may be associated with an account (e.g., a monetary or reward points account) of account holder (a) 1308 that was issued to the account holder (a) 1308 by issuer (i) 1304.

The portable consumer device may be in a form factor that can be a payment card, a gift card, a smartcard, a smart media device, a payroll card, a healthcare card, a wrist band, a machine readable medium containing account information, a keychain device, such as a SPEEDPASS® device commercially available from ExxonMobil Corporation, or a supermarket discount card, a cellular phone, personal digital assistant, a pager, a security card, an access card, a wireless terminal, or a transponder. The portable consumer device may include a volatile or non-volatile memory to store information such as the account number or the name of an account holder (a) 1308.

Merchant (m) 1310 may use the POS terminal to obtain account information, such as a number of the account of the account holder (a) 1308, from the portable consumer device. The portable consumer device may interface with the POS terminal using a mechanism including any suitable electrical, magnetic, or optical interfacing system such as a contactless system using radio frequency or magnetic field recognition system or contact system such as a magnetic stripe reader. The POS terminal sends a transaction authorization request to the issuer (i) 1304 of the account corresponding to the portable consumer device. Alternatively, or in combination, the portable consumer device may communicate with issuer (i) 1304, transaction handler 1302, or acquirer (a) 1306.

Issuer (i) 1304 may authorize the transaction using transaction handler 1302. Transaction handler 1302 may also clear the transaction. Authorization includes issuer (i) 1304, or transaction handler 1302 on behalf of issuer (i) 1304, authorizing the transaction in connection with issuer (i) 1304's instructions such as through the use of business rules. The business rules could include instructions or guidelines from transaction handler 1302, account holder (a) 1308, merchant (km) 1310, acquirer (a) 1306, issuer (i) 1304, a related financial institution, or combinations thereof. Transaction handler 1302 may maintain a log or history of authorized transactions. Once approved, merchant (m) 1310 will record the authorization, allowing account user (au) 1308 to receive the good or service from merchant (m) or an agent thereof.

Merchant (m) 1310 may, at discrete periods, such as at the end of the day, submit a list of authorized transactions to acquirer (a) 1306 or other transaction related data for processing through the payment processing system 1300. Transaction handler 1302 may compare the submitted authorized transaction list with its own log of authorized transactions. If a match is found, transaction handler 1302 may route authorization transaction amount requests from the corresponding acquirer (a) 1306 to the corresponding issuer (i) 1304 involved in each transaction. Once acquirer (a) 1306 receives the payment of the authorized transaction amount from issuer (i) 1304, acquirer (a) 1306 can forward the payment to merchant (m) 1310 less any transaction costs, such as fees for the processing of the transaction. If the transaction involves a debit or prepaid card, acquirer (a) 1306 may choose not to wait for the issuer (i) 1304 to forward the payment prior to paying merchant (m) 1310.

There may be intermittent steps in the foregoing process, some of which may occur simultaneously. For example, acquirer (a) 1306 can initiate the clearing and settling process, which can result in payment to acquirer (a) 1306 for the amount of the transaction. Acquirer (a) 1306 may request from transaction handler 1302 that the transaction be cleared and settled. Clearing includes the exchange of financial information between the issuer (i) 1304 and the acquirer (a) 1306 and settlement includes the exchange of funds. Transaction handler 1302 can provide services in connection with settlement of the transaction. The settlement of a transaction includes depositing an amount of the transaction settlement from a settlement house, such as a settlement bank, which transaction handler 1302 typically chooses, into a clearinghouse, such as a clearing bank, that acquirer (a) 1306 typically chooses. Issuer (i) 1304 deposits the same from a clearinghouse, such as a clearing bank, which issuer (i) 1304 typically chooses, into the settlement house. Thus, a typical transaction involves various entities to request, authorize, and fulfill processing the transaction.

Payment processing system 1300 will preferably have network components suitable for scaling the number and data payload size of transactions that can be authorized, cleared and settled in both real time and batch processing. These include hardware, software, data elements, and storage network devices for the same. Examples of payment processing system 1300 include those operated, at least in part, by American Express, Master Card, Discover Card, First Data Corporation, Diners Club, and Visa Inc., and agents of the foregoing.

Each network/switch (ns) 1302 can include one or more data centers for processing transactions, where each transaction can include up to 100 kilobytes of data or more. The data corresponding to the transaction can include information about the types and quantities of goods and services in the transaction, information about the account holder (a) 1308, the account user (au) 1308, the merchant (m) 1310, tax and incentive treatment(s) of the goods and services, coupons, rebates, rewards, loyalty, discounts, returns, exchanges, cash-back transactions, etc.

By way of example, network/switch (ns) 1302 can include one or more mainframe computers (e.g., one or more IBM mainframe computers) for communications over systems 1368-1376, one or more server farms (e.g., one or more Sun UNIX Superservers), where the mainframe computers and server farms can be in diverse geographic locations.

Each issuer (i) 1304 (or agent issuer (ai) 1304 thereof) and each acquirer (a) 1306 (or agent acquirer (aq) 1306 thereof) can use one or more router/switch (e.g., Cisco routers/switches) to communicate with each network/switch (ns) 1302 via dedicated communication systems 1368-1376, respectively.

Transaction handler 1302 stores information about transactions processed through payment processing system 1300 in data warehouses such as may be incorporated as part of the plurality of networks/switches (ns) 1302. This information can be data mined. The data mining transaction research and modeling can be used for advertising, account holder and merchant loyalty incentives and rewards, fraud detection and prediction, and to develop tools to demonstrate savings and efficiencies made possible by use of the payment processing system 1300 over paying and being paid by cash, checks, or other traditional payment mechanisms.

The VisaNet® system is an example component of the transaction handler 1302 in the payment processing system 1300. Presently, the VisaNet® system is operated in part by Visa Inc. As of 2007, the VisaNet® system Inc. was processing around 300 million transaction daily, on over 1 billion accounts used in over 170 countries. Financial instructions numbering over 16,000 connected through the VisaNet® system to around 30 million merchants. In 2007, around 81 billion transactions for about 4 trillion U.S. dollars were cleared and settled through the VisaNet® system, some which involved a communication length of around 24,000 miles in around two (2) seconds.

The open system payment processing network seen in FIG. 13 can be enabled via a telecommunications network that may make use of any suitable telecommunications network and may involve different hardware, different software and/or different protocols then those discussed below. FIG. 13 can be deemed to depict a global telecommunications network that supports purchase and cash transactions using any bankcard, travel and entertainment cards, and other private label and proprietary cards. The network also supports ATM transactions for other networks, transactions using paper checks, transactions using smart cards and transactions using other financial instruments.

These transactions are processed through the network's authorization, clearing and settlement services. Authorization is when an issuer approves or declines a sales transaction before a purchase is finalized or cash is dispersed. Clearing is when a transaction is delivered from an acquirer to an issuer for posting to the customer's account. Settlement is the process of calculating and determining the net financial position of each member for all transactions that are cleared. The actual exchange of funds is a separate process.

Transactions can be authorized, cleared and settled as either a dual message or a single message transaction. A dual message transaction is sent twice—the first time with only information needed for an authorization decision, an again later with additional information for clearing and settlement. A single message transaction is sent once for authorization and contains clearing and settlement information as well. Typically, authorization, clearing and settlement all occur on-line.

FIG. 13 includes one or more transaction handlers 1302, access points 1330, 1332, acquirers 1306, and issuers 1304. Other entities such as drawee banks and third party authorizing agents may also connect to the network through an access point. An interchange center is a data processing center that may be located anywhere in the world. In one embodiment, there are two in the United States and one each in the United Kingdom and in Japan. Each interchange center houses the computer system that performs the network transaction processing. The interchange center serves as the control point for the telecommunication facilities of the network, which comprise high speed leased lines or satellite connections based on IBM SNA protocol. Preferable, the communication lines that connect an interchange center (Transaction Handler 1302) to remote entities use dedicated high-bandwidth telephone circuits or satellite connections based on the IBM SNA-LUO communication protocol. Messages are sent over these lines using any suitable implementation of the ISO 8583 standard.

Access points 1330, 1332 are typically made up of small computer systems located at a processing center that interfaces between the center's host computer and the interchange center The access point facilitates the transmission of messages and files between the host and the interchange center supporting the authorization, clearing and settlement of transaction. Telecommunication links between the acquirer (q) 1306 and its access point 1332, and between the access point 1330 and issuer (i) 1304 are typically local links within a center and use a proprietary message format as preferred by the center.

A data processing center (such as is located within an acquirer, issuer, or other entity) houses processing systems that support merchant and business locations and maintains customer data and billing systems. Preferably, each processing center is linked to one or two interchange centers. Processors are connected to the closest interchange, and if the network experiences interruptions, the network automatically routes transactions to a secondary interchange center. Each interchange center is also linked to all of the other interchange centers. This linking enables processing centers to communicate with each other through one or more interchange centers. Also, processing centers can access the networks of other programs through the interchange center. Further, the network ensures that all links have multiple backups. The connection from one point of the network to another is not usually a fixed link; instead, the interchange center chooses the best possible path at the time of any given transmission. Rerouting around any faulty link occurs automatically.

FIG. 14 illustrates systems 1440 housed within an interchange center to provide on-line and off-line transaction processing. For dual message transaction, authorization system 1442 provides authorization. System 1442 supports on-line and off-line functions, and its file includes internal systems tables, a customer database and a merchant central file. The on-line functions of system 1442 support dual message authorization processing. This processing involves routing, cardholder and card verification and stand-in processing, and other functions such as file maintenance. Off-line functions including reporting, billing, and generating recovery bulletins. Reporting includes authorization reports, exception file and advice file reports, POS reports and billing reports. A bridge from system 1442 to system 1446 makes it possible for members using system 1442 to communicate with members using system 1446 and access the SMS gateways to outside networks.

Clearing and settlement system 1444 clears and settles previously authorized dual message transactions. Operating six days a week on a global basis, system 1444 collects financial and non-financial information and distributes reports between members It also calculates fees, charges and settlement totals and produces reports to help with reconciliation. A bridge forms an interchange between system 1444 processing centers and system 1446 processing centers.

Single message system 1446 processes full financial transactions. System 1446 can also process dual message authorization and clearing transactions, and communicates with system 1442 using a bridge and accesses outside networks as required. System 1446 processes Visa, Plus Interlink and other card transactions. The SMS files comprise internal system tables that control system access and processing, and the cardholder database, which contains files of cardholder data used for PIN verification and stand-in processing authorization. System 1446 on-line functions perform real-time cardholder transaction processing and exception processing for authorization as well as full financial transactions. System 1446 also accumulates reconciliation and settlement totals. System 1446 off-line functions process settlement and funds transfer requests and provide settlement and activities reporting. Settlement service 1448 consolidates the settlement functions of system 1444 and 1446, including Interlink, into a single service for all products and services. Clearing continues to be performed separately by system 1444 and system 1446.

FIG. 15 illustrates another view of components of FIGS. 13 and 14 as a telecommunications network 1300. Integrated payment system 1550 is the primary system for processing all on-line authorization and financial request transactions. System 1550 reports both dual message and single message processing. In both cases, settlement occurs separately. The three main software components are the common interface function 1552, authorization system 1442 and single message system 1446.

Common interface function 1552 determines the processing required for each message received at an interchange center. It chooses the appropriate routing, based on the source of the message (system 1442, 1444 or 1446), the type of processing request and the processing network. This component performs initial message editing, and, when necessary, parses the message and ensures that the content complies with basic message construction rules. Common interface function 1552 routes messages to their system 1442 or system 1446 destinations.

The steps of a method, process, or algorithm described in connection with the implementations disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed implementations is provided to enable any person of ordinary skill in the art to make or use the disclosure. Various modifications to these implementations will be readily apparent to those of ordinary skill in the art, and the generic principles defined herein may be applied to other implementations without departing from the spirit or scope of the disclosure. Thus, the disclosure is not intended to be limited to the implementations shown herein but is to be accorded the widest scope consistent with the principles and novel features disclosed herein.

What is claimed is:

1. A computing apparatus configured on an electronic payment processing network, the computing apparatus comprising:
a processor; and
memory storing instructions that when executed by the processor cause the processor to:
receive an authorization request initiated by a point of service (POS) terminal of a merchant in the electronic payment processing network, the authorization request associated with a payment transaction from a payment account of a user; and
in response to receiving the authorization request, and while the payment transaction is being processed:
communicate, via a transaction handler of a payment processing system, with each secondary issuer of a plurality of secondary issuers to:
receive, from the secondary issuer, an equivalent financial currency value of a loyalty currency value of the user being held by the secondary issuer, the equivalent financial currency value corresponding to a reduction of the loyalty currency value from a loyalty account of a plurality of loyalty accounts, the loyalty account controlled by the secondary issuer; and
in response to receiving the equivalent financial currency value, convert the equivalent financial currency value to an equivalent primary loyalty currency value, wherein converting the equivalent financial currency value comprises adding the equivalent primary loyalty currency value to a primary loyalty account of the user in exchange for the equivalent financial currency value received from the secondary issuer;
send, as financial tender for the payment transaction, at least a first financial currency value corresponding to a sum of loyalty currency values that are reduced in the plurality of loyalty accounts; and
reduce a balance in the primary loyalty account according to the first financial currency value sent as financial tender for the payment transaction.

2. The computing apparatus of claim 1, wherein the instructions further cause the processor to deduct from the payment account a difference between:
a transaction amount requested in the authorization request for the payment transaction; and
the first financial currency value corresponding to the sum of the loyalty currency values that are reduced in the plurality of loyalty accounts.

3. The computing apparatus of claim 1, wherein the equivalent financial currency value of the loyalty currency value being held by each secondary issuer of the plurality of secondary issuers is based on a conversion factor based on an identity of the merchant.

4. The computing apparatus of claim 1, wherein the instructions further cause the processor to clear and settle the first financial currency value sent as financial tender for the payment transaction.

5. The computing apparatus of claim 1, wherein the instructions further cause the processor to determine whether the balance in the primary loyalty account has a primary equivalent financial currency value sufficient to satisfy a total value of the transaction.

6. The computing apparatus of claim 5, wherein the instructions further cause the processor to, in response to determining that the balance in the primary loyalty account has the primary equivalent financial currency value sufficient to satisfy the total value of the transaction, send the at least a first financial currency value.

7. The computing apparatus of claim 5, wherein determining whether the balance in the primary loyalty account has the primary equivalent financial currency value sufficient to satisfy the total value of the transaction is based on an exchange rate determined by at least one of the following: a total value of the balance in the primary loyalty account; transaction history of the user; membership status of the user; location of transaction; or any combination thereof.

8. A non-transitory computer medium storing instructions which, when executed by a processor of a computing apparatus configured on an electronic payment processing network, cause the computing apparatus to:
receive an authorization request initiated by a point of service (POS) terminal of a merchant in the electronic payment processing network, the authorization request associated with a payment transaction from a payment account of a user; and
in response to receiving the authorization request, and while the payment transaction is being processed:
communicate, via a transaction handler of a payment processing system, with each secondary issuer of a plurality of secondary issuers to:
receive, from the secondary issuer, an equivalent financial currency value of a loyalty currency value of the user being held by the secondary issuer, the equivalent financial currency value corresponding to a reduction of the loyalty currency value from a loyalty account of a plurality of loyalty accounts, the loyalty account controlled by the secondary issuer; and
in response to receiving the equivalent financial currency value, convert the equivalent financial currency value to an equivalent primary loyalty currency value, wherein converting the equivalent financial currency value comprises adding the equivalent primary loyalty currency value to a primary loyalty account of the user in exchange for the equivalent financial currency value received from the secondary issuer;
send, as financial tender for the payment transaction, at least a first financial currency value corresponding to a sum of loyalty currency values that are reduced in the plurality of loyalty accounts; and
reduce a balance in the primary loyalty account according to the first financial currency value sent as financial tender for the payment transaction.

9. The non-transitory computer medium of claim 8, wherein the instructions further cause the computing apparatus to deduct from the payment account a difference between:
a transaction amount requested in the authorization request for the payment transaction; and
the first financial currency value corresponding to the sum of the loyalty currency values that are reduced in the plurality of loyalty accounts.

10. The non-transitory computer medium of claim 8, wherein the equivalent financial currency value of the loyalty currency value being held by each secondary issuer of the plurality of secondary issuers is based on a conversion factor based on an identity of the merchant.

11. The non-transitory computer medium of claim 8, wherein the instructions further cause the computing apparatus to clear and settle the first financial currency value sent as financial tender for the payment transaction.

12. The non-transitory computer medium of claim 8, wherein the instructions further cause the computing apparatus to determine whether the balance in the primary loyalty account has a primary equivalent financial currency value sufficient to satisfy a total value of the transaction.

13. The non-transitory computer medium of claim 12, wherein the instructions further cause the computing apparatus to, in response to determining that the balance in the primary loyalty account has the primary equivalent financial currency value sufficient to satisfy the total value of the transaction, send the at least a first financial currency value.

14. The non-transitory computer medium of claim 12, wherein determining whether the balance in the primary loyalty account has the primary equivalent financial currency value sufficient to satisfy the total value of the transaction is based on an exchange rate determined by at least one of the following: a total value of the balance in the primary loyalty account; transaction history of the user; membership status of the user; location of transaction; or any combination thereof.

15. A computer-implemented method comprising:
receiving, with at least one processor, an authorization request initiated by a point of service (POS) terminal of a merchant in an electronic payment processing network, the authorization request associated with a payment transaction from a payment account of a user; and
in response to receiving the authorization request, and while the payment transaction is being processed:
communicating, with the at least one processor via a transaction handler of a payment processing system, with each secondary issuer of a plurality of secondary issuers to:
receive, with the at least one processor from the secondary issuer, an equivalent financial currency value of a loyalty currency value of the user being held by the secondary issuer, the equivalent financial currency value corresponding to a reduction of the loyalty currency value from a loyalty account of a plurality of loyalty accounts, the loyalty account controlled by the secondary issuer; and
in response to receiving the equivalent financial currency value, convert, with the at least one processor, the equivalent financial currency value to an equivalent primary loyalty currency value, wherein converting the equivalent financial currency value comprises adding, with the at least one processor, the equivalent primary loyalty currency value to a primary loyalty account of the user in exchange for the equivalent financial currency value received from the secondary issuer;
sending, with the at least one processor, as financial tender for the payment transaction, at least a first financial currency value corresponding to a sum of loyalty currency values that are reduced in the plurality of loyalty accounts; and reducing, with the at least one processor, a balance in the primary loyalty account according to the first financial currency value sent as financial tender for the payment transaction.

16. The computer-implemented method of claim 15, further comprising:
deducting, with the at least one processor, from the payment account a difference between:
a transaction amount requested in the authorization request for the payment transaction; and
the first financial currency value corresponding to the sum of the loyalty currency values that are reduced in the plurality of loyalty accounts.

17. The computer-implemented method of claim 15, wherein the equivalent financial currency value of the loyalty currency value being held by each secondary issuer of the plurality of secondary issuers is based on a conversion factor based on an identity of the merchant.

18. The computer-implemented method of claim 15, further comprising clearing and settling, with the at least one processor, the first financial currency value sent as financial tender for the payment transaction.

19. The computer-implemented method of claim 15, further comprising determining, with the at least one processor, whether the balance in the primary loyalty account has a primary equivalent financial currency value sufficient to satisfy a total value of the transaction, based on an exchange rate determined by at least one of the following: a total value of the balance in the primary loyalty account; transaction history of the user; membership status of the user; location of transaction; or any combination thereof.

20. The computer-implemented method of claim 19, further comprising, in response to determining that the balance in the primary loyalty account has the primary equivalent financial currency value sufficient to satisfy the total value of the transaction, sending the at least a first financial currency value.

* * * * *